US009961439B2

(12) United States Patent
Ushio et al.

(10) Patent No.: US 9,961,439 B2
(45) Date of Patent: May 1, 2018

(54) RECORDING APPARATUS, AND CONTROL METHOD OF RECORDING APPARATUS

(71) Applicant: Olympus Corporation, Shibuya-ku, Tokyo (JP)

(72) Inventors: Mariko Ushio, Hachioji (JP); Katsuhisa Kawaguchi, Atsugi (JP); Yuichi Ito, Fuchu (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 34 days.

(21) Appl. No.: 15/046,007

(22) Filed: Feb. 17, 2016

(65) Prior Publication Data

US 2016/0165346 A1 Jun. 9, 2016

Related U.S. Application Data

(63) Continuation of application No. PCT/JP2015/067895, filed on Jun. 22, 2015.

(30) Foreign Application Priority Data

Jul. 10, 2014 (JP) ................................. 2014-142632

(51) Int. Cl.
*H04R 3/00* (2006.01)
*G06F 3/0488* (2013.01)
(Continued)

(52) U.S. Cl.
CPC ............. *H04R 3/00* (2013.01); *G06F 3/0488* (2013.01); *H04R 1/02* (2013.01); *H04R 1/08* (2013.01);
(Continued)

(58) Field of Classification Search
CPC ... H04R 3/00; H04R 1/02; H04R 1/08; H04R 1/326; H04R 3/005; H04R 29/004; G10L 15/22; G10L 2015/223; G06F 3/0488
See application file for complete search history.

(56) References Cited

U.S. PATENT DOCUMENTS 5,521,635 A * 5/1996 Mitsuhashi ............ H04N 5/772
348/231.4
9,031,256 B2 * 5/2015 Visser .................... H04R 3/005
381/122

(Continued)

FOREIGN PATENT DOCUMENTS

JP 2010-098610 4/2010
JP 2010-109614 5/2010
JP 2011-529598 12/2011

OTHER PUBLICATIONS

First Office Action to corresponding Japanese Patent Application No. 2015-552671, dated Sep. 6, 2016 (3 pgs.) with translation (4 pgs.).

(Continued)

*Primary Examiner* — Jason R Kurr
(74) *Attorney, Agent, or Firm* — John C. Pokotylo; Pokotylo Patent Services

(57) ABSTRACT

According to the present invention, a recording apparatus includes an apparatus body having a front surface and a rear surface that constitute a front and a back, a first microphone which is placed in the front surface of the apparatus body and which has a predetermined directivity, a second microphone which is provided in the rear surface facing the front surface of the apparatus body and which has a directivity that is narrower than that of the first microphone, and a recording processing unit which switches a microphone for use in recording processing between the first microphone and the second microphone to perform the recording processing in accordance with the state of the apparatus body.

15 Claims, 17 Drawing Sheets

(51) Int. Cl.
*H04R 1/02* (2006.01)
*H04R 1/08* (2006.01)
*H04R 1/32* (2006.01)
*H04R 29/00* (2006.01)
*G10L 15/22* (2006.01)

(52) U.S. Cl.
CPC ............. *H04R 1/326* (2013.01); *H04R 3/005* (2013.01); *H04R 29/004* (2013.01); *G10L 15/22* (2013.01); *G10L 2015/223* (2013.01)

(56) References Cited

U.S. PATENT DOCUMENTS

| | | | | |
|---|---|---|---|---|
| 2008/0152173 | A1* | 6/2008 | Lee | H04R 27/00 381/122 |
| 2010/0026642 | A1* | 2/2010 | Kim | G06F 3/0416 345/173 |
| 2010/0106272 | A1* | 4/2010 | Sato | G11B 20/10527 700/94 |
| 2014/0219471 | A1* | 8/2014 | Deshpande | H04R 3/005 381/92 |
| 2014/0328488 | A1* | 11/2014 | Caballero | H04R 3/00 381/58 |
| 2015/0172811 | A1* | 6/2015 | Sassi | H04R 3/002 381/71.1 |
| 2015/0277847 | A1* | 10/2015 | Yliaho | G06F 3/16 381/122 |

OTHER PUBLICATIONS

International Search Report to International Application No. PCT/JP2015/067895, dated Sep. 8, 2015 (2 pgs.) with translation (1 pg.).
Written Opinion of the International Searching Authority to corresponding International Application No. PCT/JP2015/067895, dated Sep. 8, 2015 (4 pgs.).
English language translation of the International Preliminary Report on Patentability to corresponding international application No. PCT/JP2015/067895, dated Jan. 19, 2017 (8 pgs.).

* cited by examiner

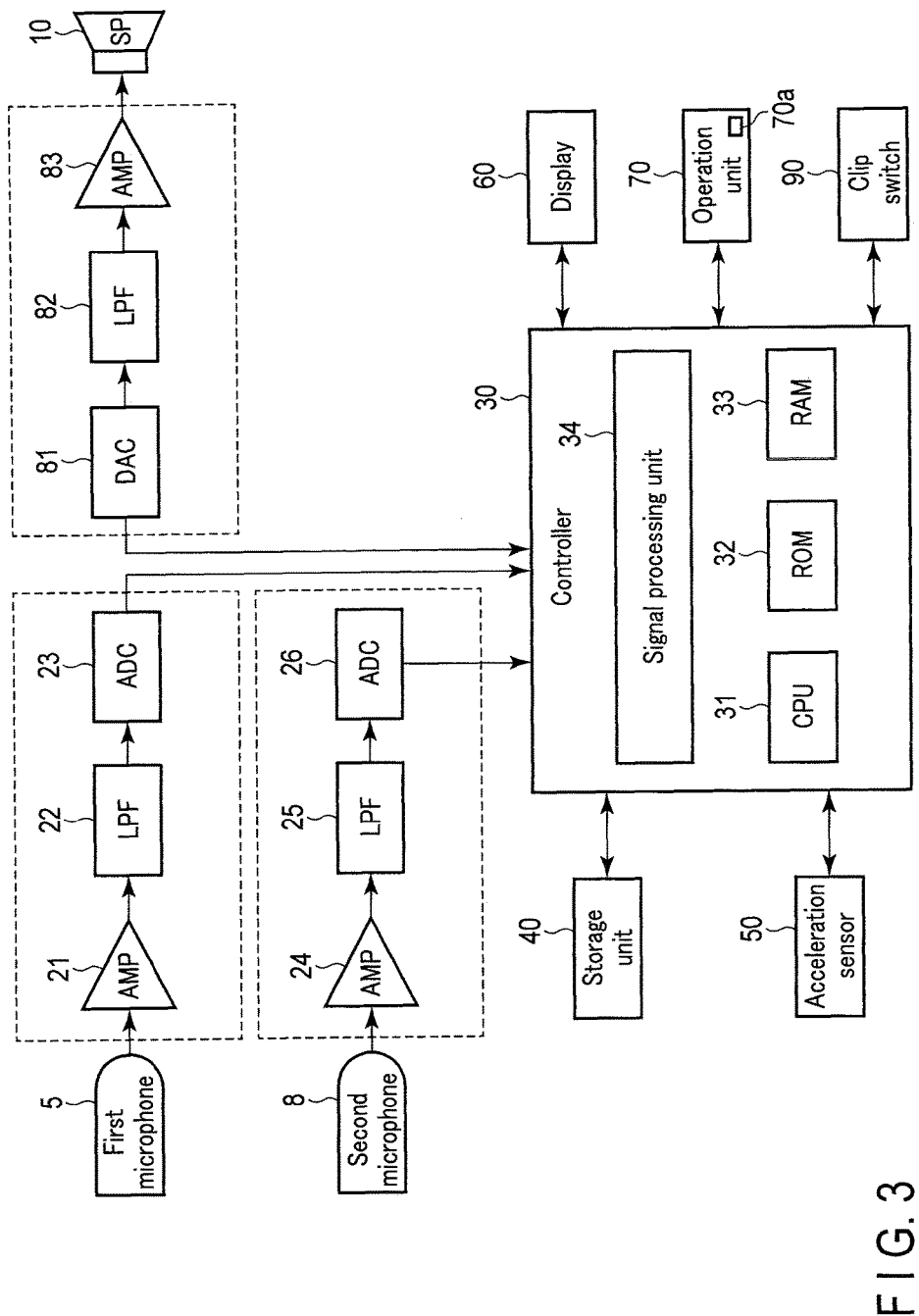
F I G. 3

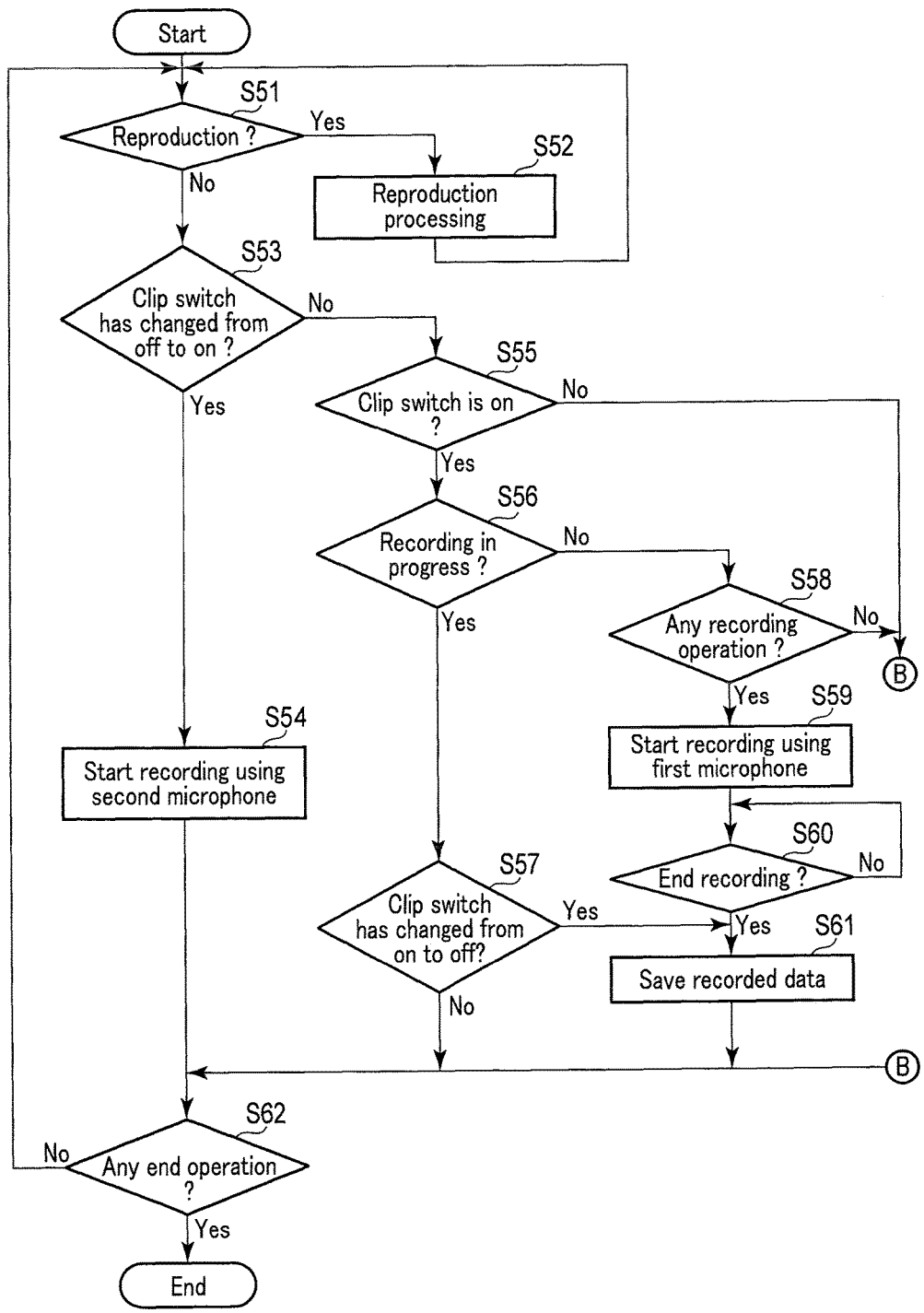
F I G. 11

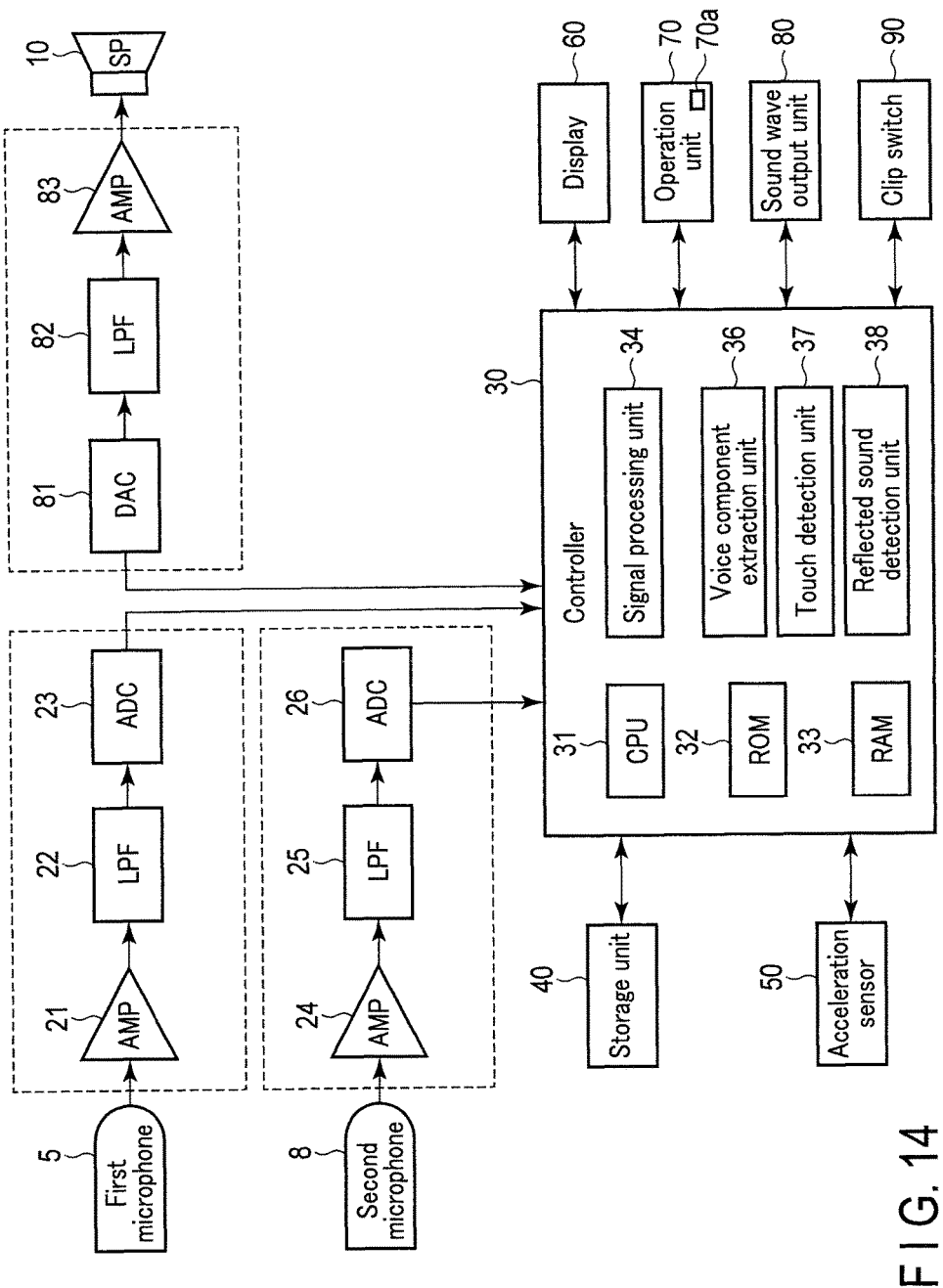
F I G. 14

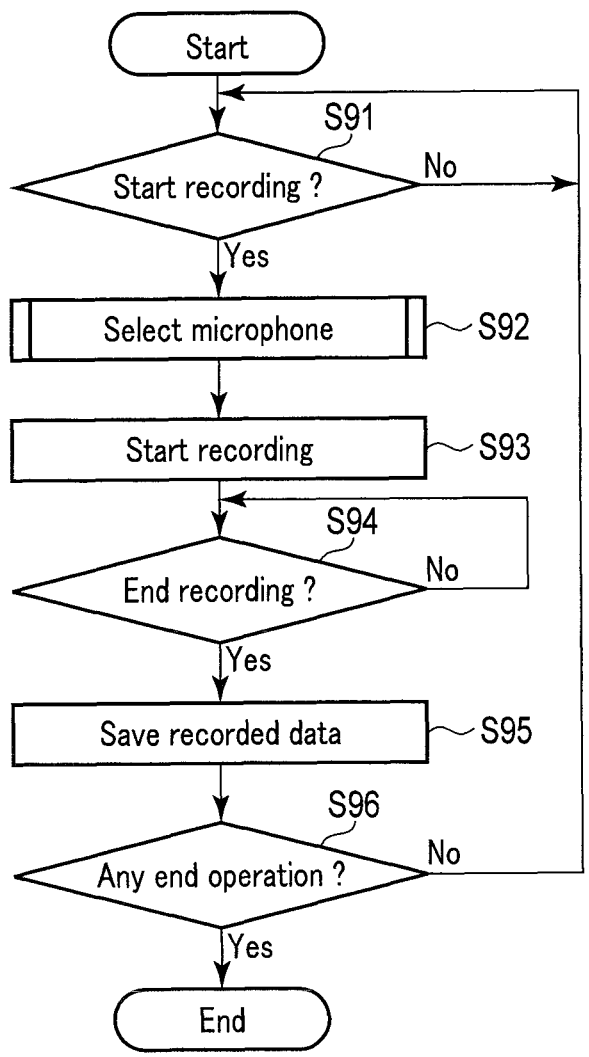
F I G. 18

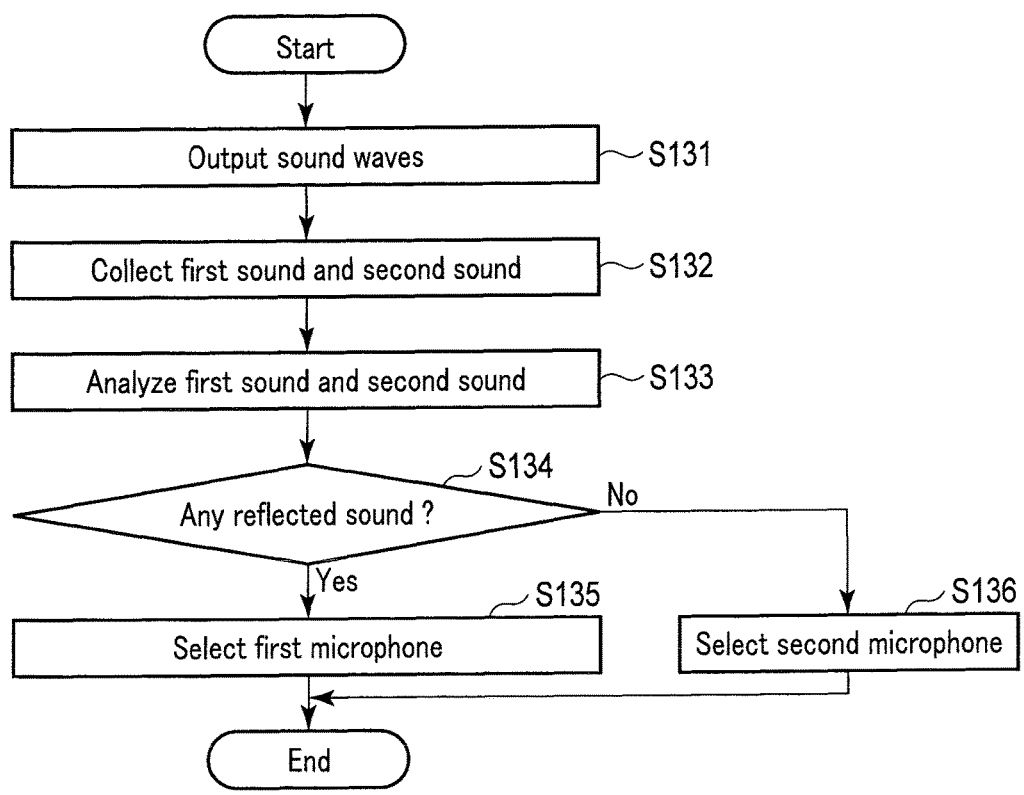
F I G. 22

RECORDING APPARATUS, AND CONTROL METHOD OF RECORDING APPARATUS

CROSS-REFERENCE TO RELATED APPLICATIONS

This application is a Continuation application of PCT Application No. PCT/JP2015/067895, filed Jun. 22, 2015 and based upon and claiming the benefit of priority from Japanese Patent Application No. 2014-142632, filed Jul. 10, 2014, the entire contents of all of which are incorporated herein by reference.

BACKGROUND OF THE INVENTION

1. Field of the Invention

The present invention relates to a recording apparatus, and a control method of a recording apparatus.

2. Description of the Related Art

Recently, recording apparatuses such as an IC recorder which can switch between stereo recording and monaural recording have come into common use. For example, Jpn. Pat. Appln. KOKAI Publication No. 2010-98610 has disclosed a recording apparatus which automatically switches between stereo recording and monaural recording in accordance with the pose.

Recording apparatuses have been undergoing size reductions. Therefore, for example, when a recording apparatus is provided with a clip, it is expected that a user may use the recording apparatus fixed to a pocket of his/her clothes. However, the conventional recording apparatus does not take into consideration the case in which the recording apparatus is fixed to the pocket. Thus, the problem of the conventional recording apparatus is that it can not perform control suited to each of cases in which the recording apparatus is placed flat on a table and in which the recording apparatus is fixed to the pocket.

BRIEF SUMMARY OF THE INVENTION

According to the present invention, a recording apparatus includes an apparatus body having a front surface and a rear surface that constitute a front and a back, a first microphone which is placed in the front surface of the apparatus body and which has a predetermined directivity, a second microphone which is provided in the rear surface facing the front surface of the apparatus body and which has a directivity that is narrower than that of the first microphone, and a recording processing unit which switches a microphone for use in recording processing between the first microphone and the second microphone to perform the recording processing in accordance with the state of the apparatus body.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram illustrating an example of a control system of the recording apparatus according to one embodiment;

FIG. 11 is a diagram illustrating an example of the operation of the recording apparatus according to one embodiment;

FIG. 14 is a diagram illustrating an example of the control system of the recording apparatus according to one embodiment;

FIG. 18 is a diagram illustrating an example of the operation of the recording apparatus according to one embodiment;

FIG. 22 is a diagram illustrating an example of the operation of the recording apparatus according to one embodiment.

DETAILED DESCRIPTION OF THE INVENTION

Hereinafter, a recording apparatus, and a control method of a recording apparatus according to one embodiment will be described in detail with reference to the drawings.

First Embodiment

Figure 1:
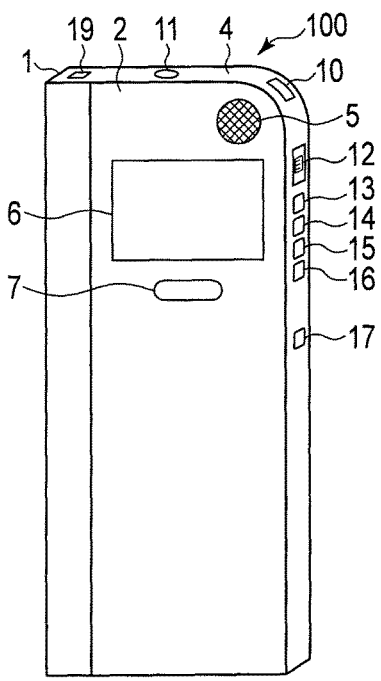
FIG. 1 is a diagram illustrating the appearance of a recording apparatus according to one embodiment.
Figure 2:
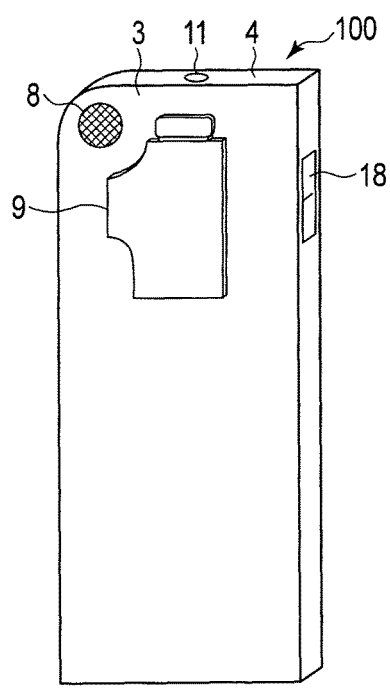
FIG. 2 is a diagram illustrating the appearance of the recording apparatus according to one embodiment.

FIG. 1 and FIG. 2 show an example of the appearance of a recording apparatus 100. FIG. 3 shows the configuration of a control system of the recording apparatus 100. The recording apparatus 100 saves sound acquired by a microphone in a storage medium.

As shown in FIG. 1 and FIG. 2, the recording apparatus 100 comprises a body 1. The body 1 comprises a front surface 2, a rear surface 3, and a side surface 4. The body 1 may have any shape that comprises the front surface 2 and the rear surface 3.

For example, a first microphone 5, a display panel 6, and a recording switch 7 are provided in the front surface 2 of the body 1. The rear surface 3 of the body 1 is a surface provided opposite to the front surface 2. That is, the rear surface 3 is a face opposite to the front surface 2, and is formed to constitute a front and a back together with the front surface 2. For example, a second microphone 8 and a clip 9 are provided in the rear surface 3. The side surface 4 of the body 1 is a surface provided between the front surface 2 and the rear surface 3. The side surface 4 comprises two long side surfaces and two short side surfaces. The two long side surfaces are provided at positions opposite to each other. The two short side surfaces are provided at positions opposite to each other. The side surface 4 comprises, for example, a speaker 10, an earphone jack 11, a power supply switch 12, a reproduction switch 13, a stop switch 14, a forward switch 15, a return switch 16, a deletion switch 17, a volume switch 18, and an indicator 19.

The first microphone 5 and the second microphone 8 are microphones which respectively convert sound to electric signals. Details of the configuration of each microphone will be described later.

The display panel 6 comprises, for example, a liquid crystal panel comprising pixels arrayed in matrix form, and a liquid crystal display device comprising a backlight which illuminates the liquid crystal panel. The display panel 6 displays display information such as the operating state of the recording apparatus 100, setting, and a list of reproducible recorded data. The display panel 6 may be configured to comprise an organic EL display in which light-emitting organic EL elements are arrayed in matrix form. The display panel 6 may have any configuration that can display the above-mentioned display information.

The recording switch 7 is a switch to cause the recording apparatus 100 to perform recording processing. When the recording switch 7 is pushed, the recording apparatus 100 starts recording by the first microphone 5 and the second microphone 8. When the recording switch 7 is operated during the execution of the recording processing, the recording apparatus 100 may be configured to stop or temporarily interrupt the recording processing.

The clip 9 is a structure to fix the body 1 of the recording apparatus 100. By catching a thin material (a catching target material) such as a plate or a cloth, the clip 9 can fix the body 1 of the recording apparatus 100 to the catching target material. The catching target material may be any material that can be caught by the clip 9 and fix the body 1.

The speaker 10 is an audio output device which outputs sound. For example, the speaker 10 can reproduce and output the recorded data recorded by the recording apparatus 100.

The earphone jack 11 is an interface to which an audio output device such as earphones or headphones to output sound is connected. When the audio output device is connected to the earphone jack 11, the recording apparatus 100 can reproduce and output the recorded data from the audio output device connected to the earphone jack 11. The power supply switch 12 is a switch to turn on and off the electric power supply of the recording apparatus 100.

The reproduction switch 13 is a switch to cause the recording apparatus 100 to perform reproduction processing of the recorded data saved by the recording apparatus 100.

The stop switch 14 is a switch to cause the recording apparatus 100 to stop the recording processing or the reproduction processing being performed by the recording apparatus 100.

The forward switch 15 is a switch to cause the recording apparatus 100 to fast-forward the recorded data being reproduced by the recording apparatus 100.

The return switch 16 is a switch to cause the recording apparatus 100 to run back the recorded data being reproduced by the recording apparatus 100.

The deletion switch 17 is a switch to cause the recording apparatus 100 to delete the recorded data saved by the recording apparatus 100.

The volume switch 18 is a switch to change the strength (volume) of the sound output by the recording apparatus 100.

The recording apparatus 100 may be configured to comprise switches such as a menu switch and a hold switch. When the menu switch is operated, the recording apparatus 100 performs display related to functional selections such as microphone sensitivity (high/low), recording modes (standard/long), and an alarm (on/off). Moreover, when the recording apparatus 100 has a clock function, the recording apparatus 100 may be configured to display the current date and time on the display panel 6 in accordance with the operation of the switch.

The indicator 19 is a module which indicates the state of the recording apparatus 100. For example, the indicator 19 comprises a light-emitting element such as an LED element. The indicator 19 emits light when the recording apparatus 100 is performing the recording processing. Thus, the indicator 19 allows the user to visually recognize that the recording apparatus 100 is performing the recording processing.

As shown in FIG. 3, the recording apparatus 100 also comprises an amplifier (AMP) 21, a low pass filter (LPF) 22, and an analog-digital converter (ADC) 23 that are connected to the first microphone 5, and an amplifier (AMP) 24, a low pass filter (LPF) 25, and an analog-digital converter (ADC) 26 that are connected to the second microphone 8. The recording apparatus 100 further comprises, for example, a controller 30, a storage unit 40, an acceleration sensor 50, a display 60, and an operation unit 70, and a clip switch 90. Moreover, the recording apparatus 100 also comprises a digital-analog converter (DAC) 81, a low pass filter (LPF) 82, and an amplifier (AMP) 83.

The first microphone 5 is a stereo microphone such as a boundary microphone characterized by having a wide sound collectable range (wide directivity). The first microphone 5 converts sound into an electric signal. The first microphone 5 outputs the electric signal to the AMP 21.

The AMP 21 is an amplifier which amplifies the electric signal. The AMP 21 amplifies the electric signal output from the first microphone 5 to a predetermined level, and outputs the amplified electric signal to the LPF 22.

The LPF 22 is a filter which cuts a predetermined frequency of the electric signal. The LPF 22 cuts the predetermined frequency (high frequency) of the electric signal output from the AMP 21, and outputs an electric signal to the ADC 23.

The ADC 23 converts the analog electric signal output from the LPF 22 into a digital audio signal. That is, the ADC 23 quantizes the analog electric signal, and converts the signal into a digital audio signal (quantized data). The ADC 23 outputs the digital audio signal to the controller 30.

The second microphone 8 is a stereo microphone characterized by having a sound collectable range narrower than that of the first microphone. The second microphone 8 converts sound into an analog electric signal. The second microphone 8 outputs the electric signal to the AMP 24.

The AMP 24 is an amplifier which amplifies the electric signal. The AMP 24 amplifies the electric signal output from the second microphone 8 to a predetermined level, and outputs the amplified electric signal to the LPF 25.

The LPF 25 is a filter which cuts a predetermined frequency (high frequency) of the electric signal. The LPF 25 cuts the predetermined frequency of the electric signal output from the AMP 24, and outputs an electric signal to the ADC 26.

The ADC 26 converts the analog electric signal output from the LPF 25 into a digital audio signal. That is, the ADC 26 quantizes the analog electric signal, and converts the signal into a digital audio signal (quantized data). The ADC 26 outputs the digital audio signal to the controller 30.

The controller 30 comprises, for example, a CPU 31, a ROM 32, a RAM 33, and a signal processing unit 34. The controller 30 performs various kinds of processing, for example, by the operation of the CPU 31 on the basis of an operation signal supplied from the operation unit 70.

The CPU 31 comprises, for example, a calculation element which performs various kinds of calculation processing. The CPU 31 enables various functions by executing programs stored in, for example, the ROM 32.

The ROM 32 stores a program to control the recording apparatus 100, and the programs to enable various functions. The CPU 31 starts the program stored in the ROM 32 on the basis of an operation signal supplied from the operation unit 70. Thus, the controller 30 controls the operation of each unit.

The RAM 33 functions as a work memory of the CPU 31. That is, the RAM 33 stores, for example, calculation results by the CPU 31, and data read by the CPU 31.

The signal processing unit 34 subjects the digital audio signal to various kinds of signal processing. For example, the signal processing unit 34 encodes the digital audio signal into a predetermined form of data under the control of the CPU 31. The signal processing unit 34 also decodes the encoded digital audio signal under the control of the CPU 31. For example, the signal processing unit 34 encodes the digital audio signal output from the ADC 23 or the ADC 26 into a predetermined form of data, and generates a digital audio signal for recording (recorded data).

The signal processing unit 34 temporarily stores the recorded data in an unshown buffer memory at the time of recording. The signal processing unit 34 sequentially performs the aforementioned decoding at the time of recording, and sequentially writes the recorded data into the buffer memory. The buffer memory comprises a structure such as a first-in first-out (FIFO) structure. The signal processing unit 34 outputs the recorded data written in the buffer memory to the storage unit 40 by a FIFO procedure. Thus, the controller 30 functions as a recording processing unit which controls the signal processing unit 34 to convert the audio signal generated by the first microphone 5 or the second microphone 8 into recorded data and saves the recorded data in the storage unit 40. Moreover, the controller 30 controls, for example, the first microphone 5, the second microphone 8, and the signal processing unit 34 to switch the microphone for use in the recording processing between the first microphone 5 and the second microphone 8 in accordance with the state of the recording apparatus 100. For example, the controller 30 switches the microphone for use in the recording processing between the first microphone 5 and the second microphone 8 in accordance with an operational input or a state such as the pose of the recording apparatus 100.

The signal processing unit 34 reads the aforementioned recorded data from a storage medium of the storage unit 40 at the time of reproduction, and writes the recorded data into the unshown buffer memory. Moreover, the signal processing unit 34 reads the recorded data from the buffer memory by the FIFO procedure, and sequentially decodes the read recorded data into a form of a digital audio signal that can be converted into an analog electric signal by the DAC 81. The controller 30 outputs the decoded digital audio signal to the DAC 81.

The storage unit 40 saves various kinds of data under the control of the controller 30. The storage unit 40 comprises a storage medium such as a semiconductor memory or a hard disk. The storage unit 40 may be configured to comprise an interface which can be electrically connected to a storage medium such as a memory card. The storage unit 40 can save the recorded data output from the controller 30 in the storage medium.

The acceleration sensor 50 can detect the acceleration of the recording apparatus 100. Thus, the recording apparatus 100 can detect the pose of the body 1 of the recording apparatus 100, for example, whether the body 1 is horizontal or vertical. That is, the acceleration sensor 50 functions as a pose detection unit which detects the pose of the body 1 of the recording apparatus 100.

The display 60 displays various kinds of information under the control of the controller 30. The display 60 comprises the display panel 6. The display 60 further comprises a display controller (not shown) which generates a screen to be displayed on the display panel 6 under the control of the controller 30.

The operation unit 70 comprises, for example, an operation key which generates an operation signal in accordance with an operational input by a user. For example, the operation unit 70 comprises the recording switch 7, the power supply switch 12, the reproduction switch 13, the stop switch 14, the forward switch 15, the return switch 16, the deletion switch 17, and the volume switch 18 that have been mentioned above. The operation unit 70 supplies the operation signal to the controller 30. The operation unit 70 also comprises a touch sensor 70a which generates a detection signal corresponding to the operational input. The operation unit 70 generates an operation signal in accordance with the detection signal generated by the touch sensor 70a. The touch sensor 70a comprises, for example, an electric capacitance sensor or a device which generates positional information by some other method. The touch sensor 70a may be formed integrally with, for example, the display panel 6 of the display 60.

The DAC 81 converts the digital audio signal output from the controller 30 into an analog audio signal (reproduction signal) that can be reproduced by the speaker. That is, the DAC 81 inversely quantizes the digital electric signal, and converts the signal into a reproduction signal. The DAC 81 outputs the reproduction signal to the LPF 82.

The LPF 82 is a filter which cuts a predetermined frequency (high frequency) of the electric signal. The LPF 82 cuts the predetermined frequency of the reproduction signal output from the DAC 81, and outputs the reproduction signal to the AMP 83.

The AMP 83 is an amplifier which amplifies the reproduction signal. The AMP 83 outputs the amplified reproduction signal to the speaker 10. That is, the AMP 83 amplifies the reproduction signal output from the LPF 82 to a predetermined level, and outputs the amplified reproduction signal to the speaker 10.

The speaker 10 can reproduce and output, as sound, the reproduction signal output from the AMP 83.

The clip switch 90 is a switch which turns on and off in accordance with the catching state of the clip 9. The clip switch 90 will be described later.

Figure 4:
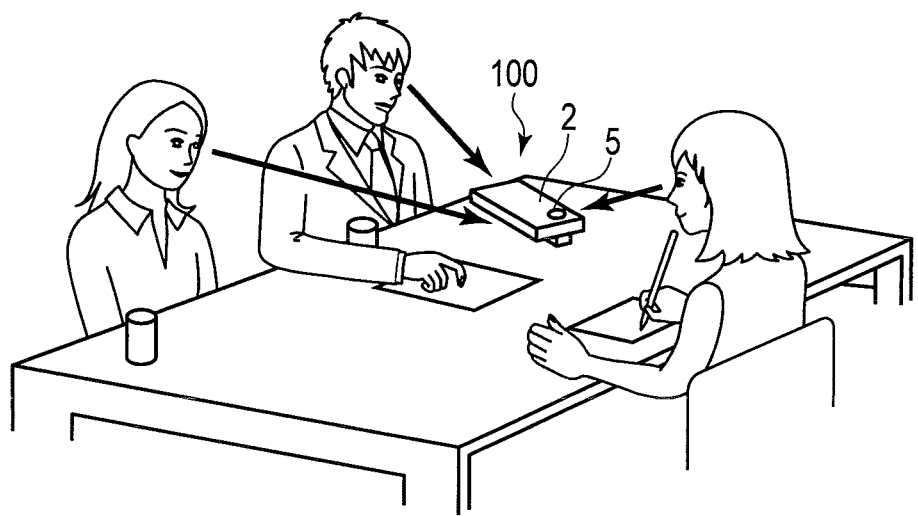
FIG. 4 is a diagram illustrating an example of the use of the recording apparatus according to one embodiment.

FIG. 4 shows an example of the use of the recording apparatus 100. When the recording apparatus 100 is placed flat, for example, on a table, it is expected that the display panel 6 faces upward. It is also expected that the direction of the recording apparatus 100 that is placed flat is unstable. Therefore, the recording apparatus 100 comprises the first microphone 5 having wide directivity in the front surface 2 of the body 1 in which the display panel 6 is placed. Thus, even if the direction of the recording apparatus 100 that is placed flat is unstable, the recording apparatus 100 can efficiently collect sound.

When the recording apparatus 100 is not placed flat, it is expected that the recording apparatus 100 is directed to a person (or a sound source). Therefore, the recording apparatus 100 comprises the second microphone 8 having directivity that is narrower than that of the first microphone 5. Thus, even if the recording apparatus 100 is directed to the person or the sound source, the recording apparatus 100 can efficiently collect sound.

Moreover, when the recording apparatus 100 is not placed flat and the pose of the body 1 sequentially changes, it is expected that the recording apparatus 100 is grasped with a hand. In this case, the recording apparatus 100 switches between the first microphone 5 and the second microphone 8 in accordance with the operation to perform recording processing. As a result, the recording apparatus 100 can efficiently collect sound with the microphone suited to the situation.

Figure 5:
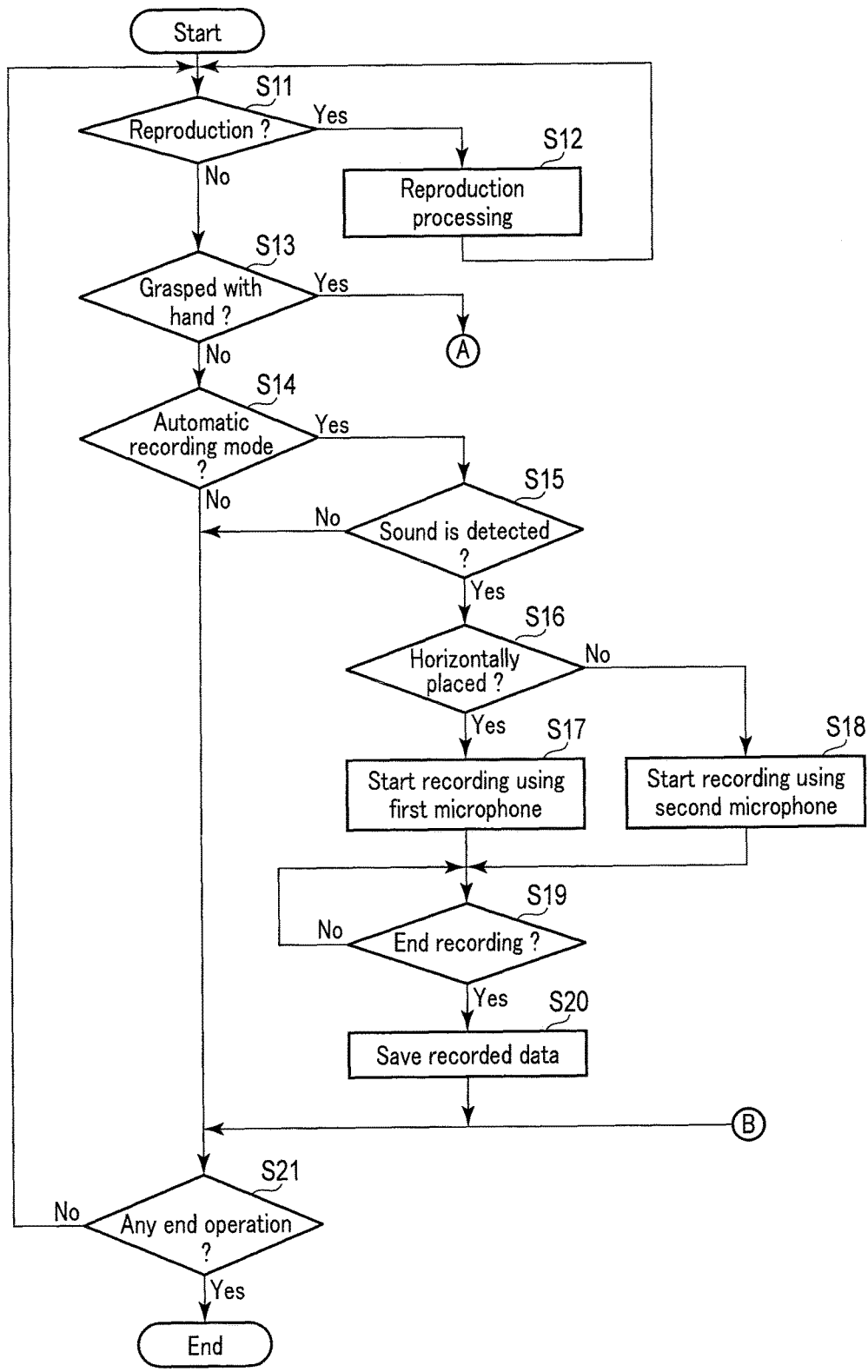
FIG. 5 is a diagram illustrating an example of the operation of the recording apparatus according to one embodiment.

FIG. 5 shows a first example of the operation of the recording apparatus 100. This is controlled by the controller 30, and is performed by the CPU 31 in cooperation with each part in accordance with a preset program. A function represented in each step may work as if it were one functional unit by the cooperation of a hard function and program control when necessary.

Figure 6:
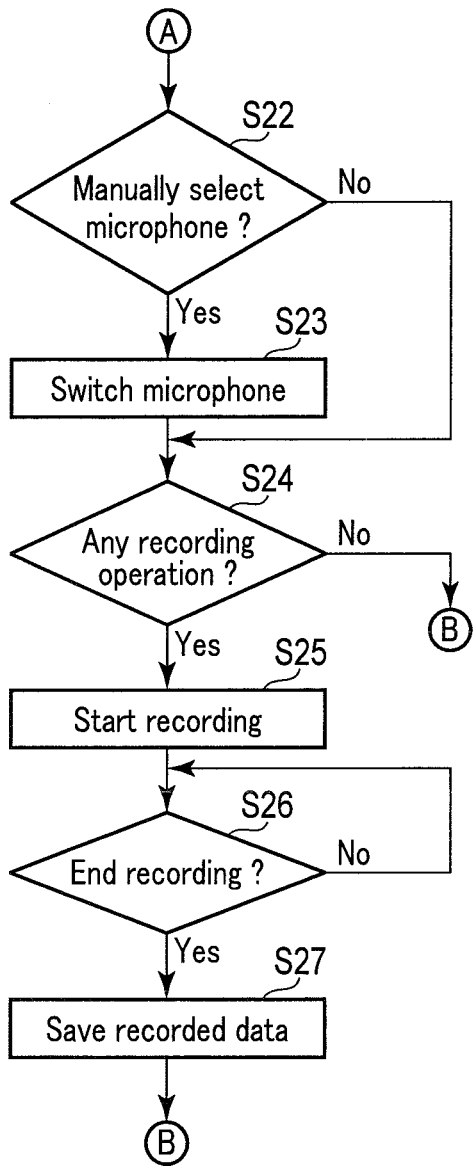
FIG. 6 is a diagram illustrating an example of the operation of the recording apparatus according to one embodiment.

When the electric power supply of the recording apparatus 100 is turned on and the recording apparatus 100 is activated, the recording apparatus 100 performs the operations shown in FIG. 5 and FIG. 6.

First, the CPU 31 of the controller 30 of the recording apparatus 100 determines whether the recording apparatus 100 is in a reproduction mode (step S11). For example, when the reproduction switch 13 is operated, the recording apparatus 100 is switched to the reproduction mode. When the recording apparatus 100 operates in the reproduction mode, the CPU 31 displays, on the display panel 6, the list of reproducible recorded data saved in the storage medium of the storage unit 40. Further, the CPU 31 performs reproduction processing to reproduce the recorded data in the list selected by the operation (step S12), and returns to step S11.

When the CPU 31 determines that the recording apparatus 100 is not in the reproduction mode, the CPU 31 determines whether the body 1 of the recording apparatus 100 is grasped with the hand (step S13). For example, when the change of the detection signal output from the acceleration sensor 50 over time is equal to or more than a predetermined change, the CPU 31 determines that the body 1 is grasped with the hand. When the change of the detection signal output from the acceleration sensor 50 over time is less than the predetermined change, the CPU 31 determines that the body 1 is put.

Furthermore, when the CPU 31 determines that the body 1 is put, the CPU 31 determines whether the recording apparatus 100 is operating in an automatic recording mode (step S14). For example, the CPU 31 switches the operation mode of the recording apparatus 100 to the automatic recording mode in accordance with the operation of the operation unit 70. When the recording apparatus 100 is operating in the automatic recording mode, the CPU 31 performs sound collection processing for collecting but not saving sound by the first microphone 5 or the second microphone 8. For example, the CPU 31 starts the recording processing when sound equal to or more than a predetermined level is detected during the sound collection processing.

The CPU 31 can determine whether the recording apparatus 100 is operating in the automatic recording mode by referring to setting information held by, for example, the RAM 33 or the storage unit 40. When the CPU 31 determines that the recording apparatus 100 is not operating in the automatic recording mode, the CPU 31 shifts to the processing in step S21 which will be described later.

When the CPU 31 determines that the recording apparatus 100 is operating in the automatic recording mode, the CPU 31 determines whether sound equal to or more than the predetermined level is detected (step S15). Although the automatic recording is started by sound here, it is possible to use biometric authentication of the user or a recording target thanks to the recent advance of sensing technology. Recording may be started not by a simple determination of whether sound is equal to or more than the predetermined level but by sound having a specific frequency or pattern. For example, the technique of speech recognition is effective for such a purpose.

When the CPU 31 determines that sound equal to or more than the predetermined level is detected, the CPU 31 determines whether the body 1 of the recording apparatus 100 is horizontally placed (step S16). For example, the CPU 31 can determine whether the body 1 is horizontally placed on the basis of the detection result by the acceleration sensor 50. Moreover, for example, the CPU 31 may be configured to determine whether the body 1 is horizontally placed and whether the display panel 6 is placed to face upward on the basis of the detection result by the acceleration sensor 50.

When the body 1 is horizontally placed, it is expected that the display panel 6 faces upward. In this case, the front surface 2 of the body 1 faces upward. As a result, the first microphone 5 is exposed. Thus, when the CPU 31 determines that the body 1 is horizontally placed, that is, when, for example, a conversation among a large number of people is to be recorded in a scene shown in FIG. 4, the recording processing is started by use of the first microphone 5 (step S17). The directivity of the first microphone is wide because sound from such a wide range is to be recorded. There is a strong possibility that such a meeting room is a closed space, and less noise is expected. This directivity also changes depending on the microphone and its arrangement, but may be close to 180°. A directivity of about 130° is often practically used.

When the body 1 is not horizontally placed, it is expected that the recording apparatus 100 is directed to the person (or the sound source). Therefore, when the CPU 31 determines that the body 1 is not horizontally placed, the CPU 31 starts the recording processing by use of the second microphone 8 having a directivity that is narrower than that of the first microphone 5 (step S18). For example, when the recording apparatus 100 is fixed to a catching target material such as a pocket of the user's clothes by the clip 9, it is expected that the change of the detection signal output from the acceleration sensor 50 over time is less than the predetermined change and that the pose of the body 1 changes to a pose that is not horizontal. However, by the processing in step S18, the CPU 31 can cause the recording apparatus 100 to perform the recording processing with a suitable microphone. This is because if recording is performed in a wide range, there is a stronger possibility of picking up noise and others, and the important sound becomes inaudible. Particularly under such circumstances, for example, in the case of passing by, it is difficult in a sense to expect any sound collection in a sufficiently quiet place. It is also difficult to bring the recording apparatus close to the mouth of a speaker in this situation, so that the S/N ratio tends to deteriorate in this sense as well. If the directivity of the second microphone is extremely narrow, the signal quantity rather decreases because of the shift in the direction of the microphone, so that a directivity of about 60° is assumed. However, this varies depending on the components to be selected and their arrangement on equipment and is therefore not strict.

When the recording processing is started, the CPU 31 sequentially determines whether to end the recording processing (step S19). For example, the CPU 31 determines to end the recording processing when the stop switch 14 is operated during the execution of the recording processing or when no sound is detected for a time equal to or more than a preset time. For the ending of recording as well, it is naturally possible to use the technique of, for example, speech recognition or other conditions instead of the simple determination by time.

When the CPU 31 has determined to end the recording processing, the CPU 31 outputs the recorded data to the storage unit 40, and saves the recorded data in the storage medium (step S20).

When the CPU 31 has saved the recorded data in the storage medium or when the CPU 31 determines in step S14 that the recording apparatus 100 is not in the automatic recording mode or when the CPU 31 determines in step S15 that no sound equal to or more than the predetermined level is detected, the CPU 31 determines whether an operation to end the operation of the recording apparatus 100 has been input (step S21). For example, when the power supply switch 12 is operated, the CPU 31 determines that the operation to end the operation of the recording apparatus 100 has been input.

When no operation to end the operation of the recording apparatus 100 has been input, the CPU 31 loops to the processing in step S11. When the CPU 31 determines that the operation to end the operation of the recording apparatus 100 has been input, the CPU 31 ends the processing.

When the CPU 31 determines in step S13 that the body 1 of the recording apparatus 100 is grasped with the hand, the CPU 31 shifts to the processing in step S22 in FIG. 6. The CPU 31 determines whether an operation to select a microphone has been input (step S22). When the recording apparatus 100 is held with the hand, the fingers can be freely used, so that it is possible to perform various operations for, for example, selecting a microphone and starting and ending recording without depending on the automatic recording.

The CPU 31 can recognize whether the microphone used by the recording apparatus 100 in the recording processing is the first microphone 5 or the second microphone 8 by referring to the setting information held by, for example, the RAM 33 or the storage unit 40. That is, the setting information includes information indicating the microphone used by the recording apparatus 100 in the recording processing.

When the CPU 31 determines that the operation to select a microphone has been input, the CPU 31 switches the microphone used by the recording apparatus 100 in the recording processing between the first microphone 5 and the second microphone 8 in accordance with the operation by the operation unit 70 (step S23). More specifically, the CPU 31 rewrites the information in the setting information indicating the microphone used by the recording apparatus 100 in the recording processing in accordance with the operation by the operation unit 70.

The CPU 31 also determines whether an operation (recording operation) to cause the recording apparatus 100 to start the recording processing has been input (step S24). For example, the CPU 31 determines that the recording operation has been input when the recording switch 7 is operated. When the CPU 31 determines that the recording processing has been input, the CPU 31 causes the recording apparatus 100 to start the recording processing by use of the microphone specified by the setting information (step S25).

When the recording processing is started, the CPU 31 sequentially determines whether to end the recording processing (step S26). For example, the CPU 31 determines to end the recording processing when the stop switch 14 is operated during the execution of the recording processing or when no sound is detected for a time equal to or more than a preset time.

When the CPU 31 determines to end the recording processing, the CPU 31 outputs the recorded data to the storage unit 40, and saves the recorded data in the storage medium (step S27). When the recorded data is saved in the storage medium or when the CPU 31 determines in step S24 that the recording operation has not been input, the CPU 31 shifts to the processing in step S21 in FIG. 5.

According to the configuration described above, for example, the recording apparatus 100 performs the recording processing by the first microphone 5 when the body 1 is placed flat on the table. The recording apparatus 100 performs the recording processing by the second microphone 8 when the body 1 is not placed flat. The recording apparatus 100 performs the recording processing by the microphone selected in accordance with the operation when the body 1 is grasped with the hand. When the body 1 is grasped with the hand, it may be possible to bring the microphone to the mouth, and it may not be necessary to pay attention to directivity. The first microphone can be initially set. Thus, the recording apparatus 100 according to the present embodiment can perform the recording processing by use of the microphone having characteristics suited to the pose and state of the recording apparatus 100.

Figure 7:
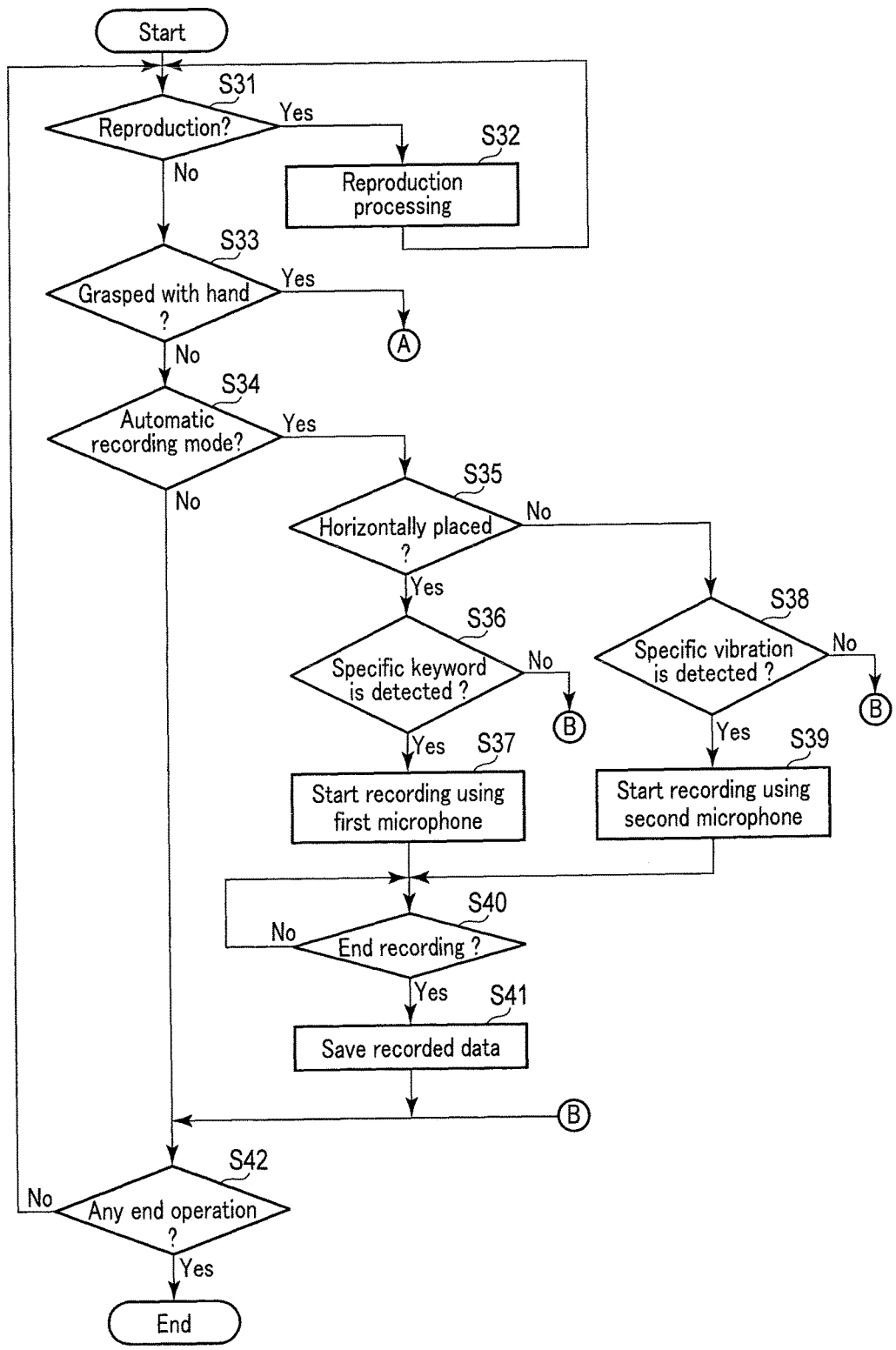
FIG. 7 is a diagram illustrating an example of the operation of the recording apparatus according to one embodiment.

FIG. 7 shows a second example of the operation of the recording apparatus 100.

When the electric power supply of the recording apparatus 100 is turned on and the recording apparatus 100 is activated, the recording apparatus 100 performs the operation shown in FIG. 7.

First, the CPU 31 of the controller 30 of the recording apparatus 100 determines whether the recording apparatus 100 is in the reproduction mode (step S31). When the recording apparatus 100 operates in the reproduction mode, the CPU 31 displays, on the display panel 6, the list of reproducible recorded data saved in the storage medium of the storage unit 40. Further, the CPU 31 performs reproduction processing to reproduce the recorded data in the list selected by the operation (step S32), and returns to step S31.

When the CPU 31 determines that the recording apparatus 100 is not in the reproduction mode, the CPU 31 determines whether the body 1 of the recording apparatus 100 is grasped with the hand (step S33). When the CPU 31 determines that the body 1 is grasped with the hand, the CPU 31 executes the processing in step S22 to step S27 in FIG. 6, and shifts to the processing in step S42 in FIG. 7 which will be described later.

When the change of the detection signal output from the acceleration sensor 50 over time is less than the predetermined change and the CPU 31 determines that the body 1 is put, the CPU 31 determines whether the recording apparatus 100 is operating in the automatic recording mode (step S34).

When the CPU 31 determines that the recording apparatus 100 is operating in the automatic recording mode, the CPU 31 determines whether the body 1 of the recording apparatus 100 is placed flat (step S35).

When the CPU 31 determines that the body 1 is placed flat, the CPU 31 collects sound, extracts a keyword from the sound, performs, by the first microphone 5 or the second microphone 8, sound collection processing that is not to be saved, and determines whether a specific keyword is extracted during the sound collection processing (step S36). The CPU 31 performs speech recognition processing for the sound acquired during the sound collection processing. Thus, the CPU 31 can extract a word from the sound as a keyword. Further, the ROM 32, the RAM 33, or the storage unit 40 comprises a dictionary having pieces of information indicating words that can be checked against the keyword. The CPU 31 compares the extracted keyword with the word in the dictionary. When a keyword corresponding to the word in the dictionary is extracted, the CPU 31 starts recording processing by use of the first microphone 5 (step S37), and shifts to the processing in step S40.

Keywords indicating the start of recording are stored in the dictionary. The keywords are such words as "recording start" and "Let's start". The keywords may be any words.

When the CPU 31 determines in step S35 that the body 1 is not placed flat, the CPU 31 determines whether specific vibration is detected (step S38). For example, the CPU 31 determines whether vibration having a specific pattern is detected on the basis of the detection result by the acceleration sensor 50. For example, the recording apparatus 100 previously stores, in the ROM 32, the RAM 33, or the storage unit 40, the pattern of the vibration when a pen is pulled out of the pocket of the clothes of the user of the recording apparatus 100. When vibration corresponding to this vibration pattern is detected by the acceleration sensor 50, the CPU 31 determines that specific vibration is detected. That is, the acceleration sensor 50 functions as a vibration detection unit which detects vibration for the body 1 of the recording apparatus 100. The pattern of the vibration may be any pattern of sound such as the sound of a bell or the noise of the contact between the pen and the table.

When the CPU 31 determines that specific vibration is detected, the CPU 31 starts recording processing by use of the second microphone 8 (step S39), and shifts to the processing in step S40.

As described above, when the specific vibration pattern is included in the sound signal collected by the first microphone 5 or the second microphone 8, the CPU 31 starts recording processing by use of the second microphone 8. When the specific keyword is included in the result of the speech recognition processing for the sound signal collected by the first microphone 5 or the second microphone 8, the CPU 31 starts recording processing by use of the first microphone 5. That is, when the sound signal collected by the first microphone 5 or the second microphone 8 meets a preset condition, the CPU 31 can automatically start recording by the first microphone 5 or the second microphone 8.

When the CPU 31 determines in step S36 that the specific keyword is not detected or when the CPU 31 determines in step S38 that the specific vibration is not detected, the CPU 31 shifts to step S42.

When the recording processing is started, the CPU 31 sequentially determines whether to end the recording processing (step S40). For example, the CPU 31 determines to end the recording processing when the stop switch 14 is operated during the execution of the recording processing or when no sound is detected for a time equal to or more than a preset time. When the CPU 31 determines to end the recording processing, the CPU 31 outputs the recorded data to the storage unit 40, and saves the recorded data in the storage medium (step S41).

When the recorded data is saved in the storage medium or when the CPU 31 determines in step S34 that the recording apparatus 100 is not operating in the automatic recording mode, the CPU 31 determines whether an operation to end the operation of the recording apparatus 100 has been input (step S42). For example, when the power supply switch 12 is operated, the CPU 31 determines that the operation to end the operation of the recording apparatus 100 has been input.

When no operation to end the operation of the recording apparatus 100 has been input, the CPU 31 loops to the processing in step S31. When the CPU 31 determines that the operation to end the operation of the recording apparatus 100 has been input, the CPU 31 ends the processing.

According to the configuration described above as well, for example, the recording apparatus 100 performs the recording processing by the first microphone 5 when the body 1 is placed flat on the table and the specific keyword is detected, and the recording apparatus 100 performs recording by the second microphone 8 when the body 1 is fixed without being placed flat and the specific vibration is detected. Thus, the recording apparatus 100 can perform the recording processing by use of the microphone having suitable characteristics in accordance with the pose of the body 1 of the recording apparatus 100 and the situation around the recording apparatus 100.

Although the CPU 31 is configured to start the recording processing when a keyword is extracted as shown in step S37, the CPU 31 is not limited to this configuration. The CPU 31 may be configured to start the recording processing when a combination of keywords is extracted. For example, the CPU 31 may be configured to determine whether a second keyword is detected within a predetermined time after the detection of a first keyword, and start recording processing when the second keyword is detected within the predetermined time after the detection of the first keyword. Moreover, the CPU 31 may be configured to end the recording processing when the specific keyword is detected during the recording processing. In addition, for the start and end of recording and the switch of the microphones, the modified control that has been already described may be performed.

Figure 8:
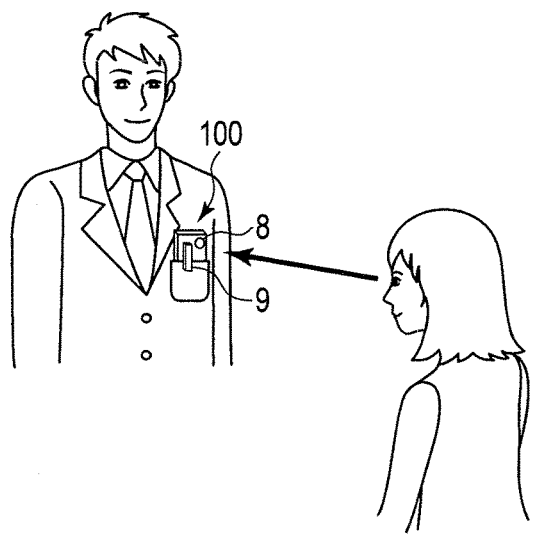
FIG. 8 is a diagram illustrating an example of the use of the recording apparatus according to one embodiment.

FIG. 8 shows another example of the use of the recording apparatus 100. When the recording apparatus 100 is fixed to a catching target material such as a breast pocket of the user by the clip 9, it is expected that the rear surface 3 of the body 1 in which the clip 9 is provided is directed to a person facing the user. Thus, the recording apparatus 100 performs the recording processing by the second microphone 8 provided in the rear surface 3 of the body 1 when the recording apparatus 100 is fixed by the clip 9.

Figure 9:
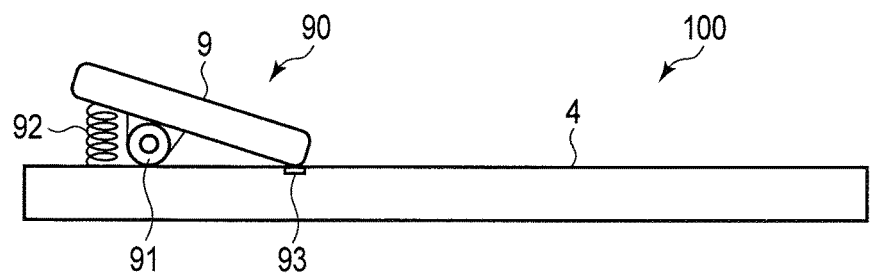
FIG. 9 is a diagram illustrating an example of the configuration of a part of the recording apparatus according to one embodiment.
Figure 10:
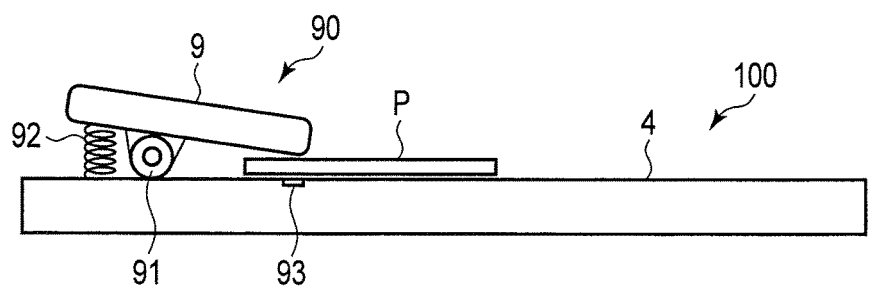
FIG. 10 is a diagram illustrating an example of the configuration of a part of the recording apparatus according to one embodiment.

FIG. 9 and FIG. 10 show examples of the configuration of the clip switch 90.

The clip switch 90 comprises the clip 9, a hinge 91, a driver 92, and a pressure-sensitive switch 93. The clip 9 is a plate-shaped structure. The hinge 91 is a component to rotatably fix the clip 9 to the rear surface 3 of the body 1. The driver 92 is a component to apply stress to the clip 9. The pressure-sensitive switch 93 is a switch which turns on and off in accordance with the presence of pressure.

The driver 92 is provided to lift one end of the clip 9 from the side of the rear surface 3 of the body 1. Thus, the other end (i.e. the end opposite to the driver 92) of the clip 9 applies pressure to the rear surface 3 of the body 1 with the hinge 91 as a supporting point. Thus, the clip 9 can catch and fix a catching target material P which intervenes between the clip 9 and the body 1.

The pressure-sensitive switch 93 is provided at a position which is on the rear surface 3 of the body 1 and which contacts the other end of the clip 9. That is, the pressure-sensitive switch 93 (or the clip switch 90) is configured to turn on when the catching target material P is not caught between the clip 9 and the rear surface 3 of the body 1 as shown in FIG. 9, and the pressure-sensitive switch 93 (or the clip switch 90) is configured to turn off when the catching target material P is caught between the clip 9 and the rear surface 3 of the body 1 as shown in FIG. 10.

The CPU 31 of the recording apparatus 100 can determine whether the catching target material P is caught between the clip 9 and the rear surface 3 of the body 1 in accordance with whether the pressure-sensitive switch 93 of the clip switch 90 has turned on or off. The controller 30 may be configured to switch the microphone for use in the recording processing between the first microphone 5 and the second microphone 8 in accordance with whether the pressure-sensitive switch 93 of the clip switch 90 has turned on or off and in accordance with the pose of the recording apparatus 100. Moreover, the controller 30 may be configured to automatically start the recording processing in accordance with whether the pressure-sensitive switch 93 of the clip switch 90 has turned on or off.

FIG. 11 shows a third example of the operation of the recording apparatus 100. In the example of FIG. 11, the recording apparatus 100 performs the recording processing when the recording apparatus 100 is pulled out of, for example, the breast pocket of the user.

When the electric power supply of the recording apparatus 100 is turned on and the recording apparatus 100 is activated, the recording apparatus 100 performs the operation shown in FIG. 11.

First, the CPU 31 of the controller 30 of the recording apparatus 100 determines whether the recording apparatus 100 is in the reproduction mode (step S51). When the recording apparatus 100 operates in the reproduction mode, the CPU 31 displays, on the display panel 6, the list of recorded data saved in the storage medium of the storage unit 40. Further, the CPU 31 performs reproduction processing to reproduce the recorded data in the list selected by the operation (step S52), and returns to step S51.

When the CPU 31 determines that the recording apparatus 100 is not in the reproduction mode, the CPU 31 determines whether the clip switch 90 (or the pressure-sensitive switch 93) of the recording apparatus 100 has changed from off to on (step S53). When the CPU 31 determines that the clip switch 90 of the recording apparatus 100 has changed from off to on, the CPU 31 starts the recording processing by use of the second microphone 8 (step S54), and shifts to the processing in step S62. The CPU 31 may be configured to turn on the indicator 19 when the recording processing is started in step S54. Thus, even if the CPU 31 automatically starts the recording processing in accordance with the operation of the clip switch 90, the CPU 31 allows the user to visually recognize that the recording apparatus 100 is performing the recording processing.

When the CPU 31 determines in step S53 that the clip switch 90 of the recording apparatus 100 has not changed from off to on, the CPU 31 determines whether the clip switch 90 has already turned on (step S55). When the CPU 31 determines that the clip switch 90 is off, the CPU 31 shifts to the processing in step S62.

When the CPU 31 determines that the clip switch 90 is on, the CPU 31 determines whether the recording processing is being performed (step S56). When the CPU 31 determines that the recording processing is being performed, the CPU 31 determines whether the clip switch 90 has changed from on to off (step S57). When the CPU 31 determines that the clip switch 90 has not changed from on to off, the CPU 31 shifts to the processing in step S62.

When the CPU 31 determines in step S56 that the recording processing is not being performed, the CPU 31 determines whether the recording operation has been input (step S58). For example, the CPU 31 determines that the recording operation has been input when the recording switch 7 is operated. When the CPU 31 determines that the recording operation has not been input, the CPU 31 shifts to the processing in step S62.

When the CPU 31 determines that the recording operation has been input, the CPU 31 starts recording processing by use of the first microphone 5 (step S59). Moreover, the CPU 31 may be configured to turn on the indicator 19 when the recording processing is started in step S59. Thus, the CPU 31 allows the user of the recording apparatus 100 to visually recognize that the recording apparatus 100 is performing the recording processing.

When the recording processing is started, the CPU 31 sequentially determines whether to end the recording processing (step S60). For example, the CPU 31 determines to end the recording processing when the stop switch 14 is operated during the execution of the recording processing or when no sound is detected for a time equal to or more than a preset time. When the CPU 31 determines to end the recording processing, the CPU 31 outputs the recorded data to the storage unit 40, saves the recorded data in the storage medium (step S61), and shifts to the processing in step S62. The CPU 31 may be configured to turn off the indicator 19 in step S61 when the indicator 19 is on in step S54 or step S59. Thus, the CPU 31 allows the user of the recording apparatus 100 to visually recognize that the recording apparatus 100 has ended the recording processing.

When the CPU 31 determines in step S57 that the clip switch 90 has changed from on to off, the CPU 31 shifts to the processing in step S61, and ends the recording processing.

The CPU 31 determines in step S62 whether an operation to end the operation of the recording apparatus 100 has been input (step S62). For example, when the power supply switch 12 is operated, the CPU 31 determines that the operation to end the operation of the recording apparatus 100 has been input.

When no operation to end the operation of the recording apparatus 100 has been input, the CPU 31 loops to the processing in step S51. When the CPU 31 determines that the operation to end the operation of the recording apparatus 100 has been input, the CPU 31 ends the processing.

For example, as described above, when the clip switch 90 of the recording apparatus 100 has changed from off to on, a scene in which the recording apparatus 100 is pulled out of the breast pocket of the user is expected. Thus, the CPU 31 starts the recording processing by use of the second microphone 8 when the CPU 31 determines that the clip switch 90 of the recording apparatus 100 has changed from off to on. As a result, it is possible to more simply cause the recording apparatus 100 to start recording processing. The CPU 31 ends the recording processing when the clip switch 90 of the recording apparatus 100 has changed from on to off. Thus, the CPU 31 can end the recording processing when the recording apparatus 100 is again put into the breast pocket of the user.

In the example described above, the CPU 31 may be configured to save the recorded data in the storage unit 40 as a different file without ending the recording processing in step S61, and continue the recording processing when the CPU 31 determines in step S57 that the clip switch 90 has changed from off to on.

Figure 12:
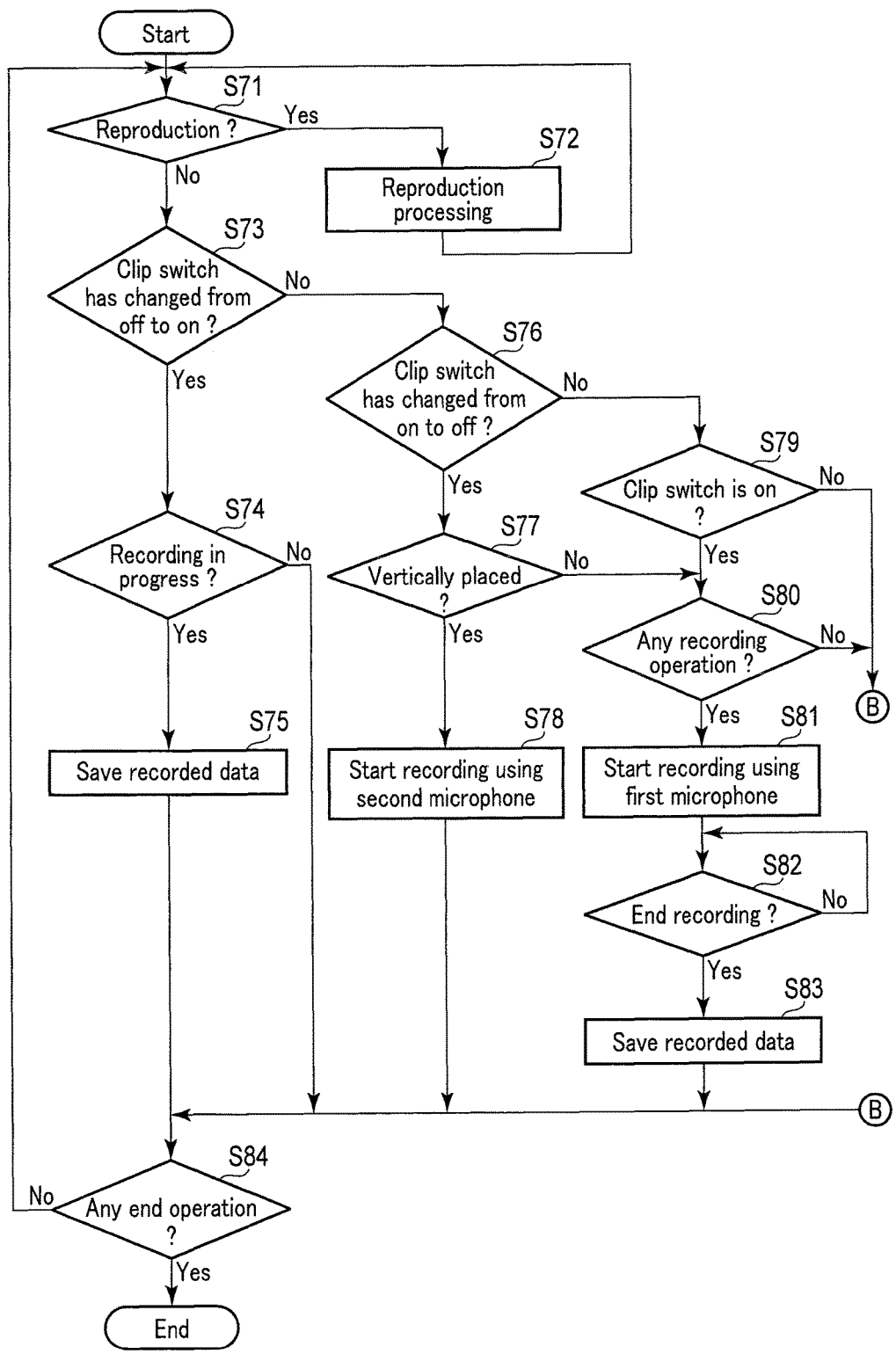
FIG. 12 is a diagram illustrating an example of the operation of the recording apparatus according to one embodiment.

FIG. 12 shows a fourth example of the operation of the recording apparatus 100. In this example, the recording apparatus 100 performs the recording processing when the recording apparatus 100 is put into, for example, the breast pocket of the user.

When the electric power supply of the recording apparatus 100 is turned on and the recording apparatus 100 is activated, the recording apparatus 100 performs the operation shown in FIG. 12.

First, the CPU 31 of the controller 30 of the recording apparatus 100 determines whether the recording apparatus 100 is in the reproduction mode (step S71). When the recording apparatus 100 operates in the reproduction mode, the CPU 31 displays, on the display panel 6, the list of reproducible recorded data saved in the storage medium of the storage unit 40. Further, the CPU 31 performs reproduction processing to reproduce the recorded data in the list selected by the operation (step S72), and returns to step S71.

When the CPU 31 determines that the recording apparatus 100 is not in the reproduction mode, the CPU 31 determines whether the clip switch 90 (or the pressure-sensitive switch 93) of the recording apparatus 100 has changed from off to on (step S73). When the CPU 31 determines that the clip switch 90 of the recording apparatus 100 has changed from off to on, the CPU 31 determines whether the recording processing is being performed (step S74). When the CPU 31 determines that the recording processing is not being performed, the CPU 31 shifts to the processing in step S84. When the CPU 31 determines that the recording processing is being performed, the CPU 31 outputs the recorded data to the storage unit 40, saves the recorded data in the storage medium (step S75), and shifts to the processing in step S84.

When the CPU 31 determines in step S73 that the clip switch 90 of the recording apparatus 100 has not changed from off to on, the CPU 31 determines whether the clip switch 90 of the recording apparatus 100 has turned changed from on to off (step S76). When the CPU 31 determines that the clip switch 90 of the recording apparatus 100 has changed from on to off, the CPU 31 determines whether the body 1 of the recording apparatus 100 is vertically placed on the basis of the detection result by the acceleration sensor (step S77). When the CPU 31 determines that the body 1 of the recording apparatus 100 is vertically placed, the CPU 31 starts the recording processing by use of the second microphone 8 (step S78), and shifts to the processing in step S84.

The CPU 31 may be configured to turn on the indicator 19 in step S61 when the recording processing is started in step S78. Thus, even if the CPU 31 automatically starts the recording processing in accordance with the operation of the clip switch 90, the CPU 31 allows the user of the recording apparatus 100 to visually recognize that the recording apparatus 100 is performing the recording processing.

Moreover, the CPU 31 may be configured to record sound having a preset frequency range when the recording processing is started in step S78. For example, when the clip switch 90 of the recording apparatus 100 has changed from on to off and the body 1 is vertically placed, it is expected that the recording apparatus 100 is attached to the breast pocket of the user. In this case, there is a possibility that the recording apparatus 100 records both noise caused by the rustling of cloths and a conversation. However, if the frequency range to be recorded is restricted to a frequency range close to, for example, human voice, the recording apparatus 100 can record sound in a more audible manner. Further, according to this configuration, the recording apparatus 100 can reduce the volume of the recorded data.

Moreover, when the recording processing is started in step S78 and the operation unit 70 comprises the touch sensor 70a, the CPU 31 may be configured to invalidate the touch sensor 70a during the recording processing. Thus, it is possible to prevent the recording apparatus 100 from being operated by the touch sensor 70a while the recording apparatus 100 is in the breast pocket of the user.

Furthermore, the recording apparatus 100 may comprise an unshown vibrator. For example, the CPU 31 may be configured to vibrate the unshown vibrator instead of turning on the indicator 19 when the recording processing is started in step S78. Thus, the recording apparatus 100 allows the user to recognize that the recording apparatus 100 has started the recording processing.

When the CPU 31 determines in step S76 that the clip switch 90 of the recording apparatus 100 has not changed from on to off, the CPU 31 determines whether the clip switch 90 has already turned on (step S79). When the CPU 31 determines that the clip switch 90 is not on, the CPU 31 shifts to the processing in step S84.

When the CPU 31 determines that the body 1 of the recording apparatus 100 is not vertically placed in step S77 or when the CPU 31 determines in step S79 that the clip switch 90 is not on, the CPU 31 determines whether the recording operation has been input (step S80). For example, the CPU 31 determines that the recording operation has been input when the recording switch 7 is operated. When the CPU 31 determines that the recording operation has not been input, the CPU 31 shifts to the processing in step S84.

When the CPU 31 determines that the recording operation has been input, the CPU 31 starts recording processing by use of the first microphone 5 (step S81). Moreover, the CPU 31 may be configured to turn on the indicator 19 when the recording processing is started in step S81. Thus, the CPU 31 allows the user of the recording apparatus 100 to visually recognize that the recording apparatus 100 is performing the recording processing.

When the recording processing is started, the CPU 31 sequentially determines whether to end the recording processing (step S82). For example, the CPU 31 determines to end the recording processing when the stop switch 14 is operated during the execution of the recording processing or when no sound is detected for a time equal to or more than a preset time. When the CPU 31 determines to end the recording processing, the CPU 31 outputs the recorded data to the storage unit 40, saves the recorded data in the storage medium (step S83), and shifts to the processing in step S84. The CPU 31 may be configured to turn off the indicator 19 in step S83 when the indicator 19 has turned on in step S78 or step S81. Thus, the CPU 31 allows the user of the recording apparatus 100 to visually recognize that the recording apparatus 100 has ended the recording processing.

The CPU 31 determines in step S84 whether an operation to end the operation of the recording apparatus 100 has been input (step S84). For example, when the power supply switch 12 is operated, the CPU 31 determines that the operation to end the operation of the recording apparatus 100 has been input.

When no operation to end the operation of the recording apparatus 100 has been input, the CPU 31 loops to the processing in step S71. When the CPU 31 determines that the operation to end the operation of the recording apparatus 100 has been input, the CPU 31 ends the processing.

For example, as described above, when the clip switch 90 of the recording apparatus 100 has changed from on to off and the body 1 is vertically placed, a scene in which the recording apparatus 100 is attached to the breast pocket of the user is expected. Thus, the CPU 31 starts the recording processing by use of the second microphone 8 when the CPU 31 determines that the clip switch 90 of the recording apparatus 100 has changed from on to off and the body 1 is vertically placed. As a result, the CPU 31 can more simply cause the recording apparatus 100 to start the recording processing. The CPU 31 ends the recording processing when the clip switch 90 of the recording apparatus 100 has changed from off to on. Thus, the CPU 31 can end the recording processing when the recording apparatus 100 is pulled out of the breast pocket of the user.

Although the CPU 31 is configured to determine whether to perform the recording processing and whether to end the recording processing on the basis of whether the clip switch 90 has turned on or off in the example described above, the CPU 31 is not limited to this configuration. The CPU 31 may be configured to detect the vibration of the clip 9 and noise at the time of the rotation of the clip 9, and determine whether to perform the recording processing and whether to end the recording processing on the basis of the detection result. Thus, the recording apparatus 100 may be configured to comprise, for example, a detector for detecting the vibration of the clip 9, and a detector for detecting the rotation noise of the clip 9. In this case, the recording apparatus 100 can recognize whether the clip 9 is catching the catching target material on the basis of the detection results by the detectors.

Furthermore, when the CPU 31 is configured to detect the rotation noise of the clip 9 and then end the recording processing, the CPU 31 may be configured to cut the last several seconds of the recorded data and then record the recorded data in the storage unit 40. Several seconds to be cut may be freely set in advance.

Moreover, the first microphone 5 and the second microphone 8 are respectively configured as stereo microphones. Therefore, the CPU 31 can recognize the direction of the sound source which is generating sound on the basis of the recorded data acquired by each of the microphones. Thus, for example, the CPU 31 may display, on the display panel 6, the direction in which the sound source exists during the recording processing. Moreover, the CPU 31 may be configured to add information indicating the direction in which the sound source exists to the recorded data.

Figure 13:
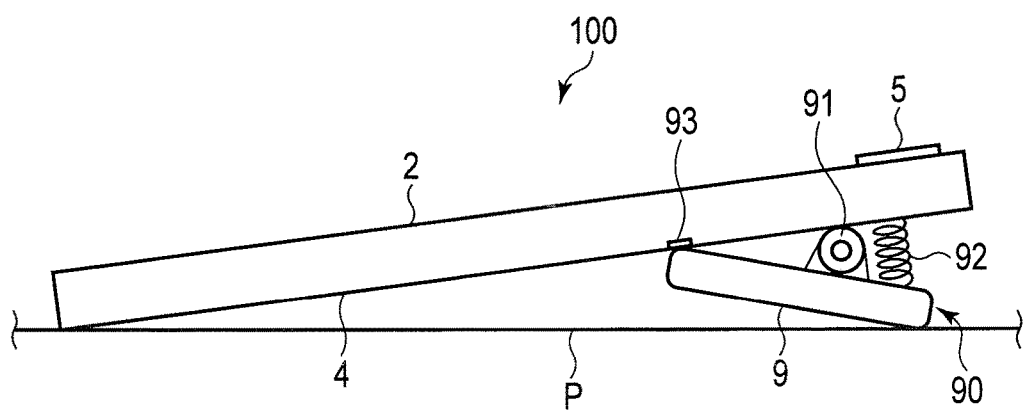
FIG. 13 is a diagram illustrating an example of the configuration of a part of the recording apparatus according to one embodiment.

FIG. 13 shows an example in which the front surface 2 of the body 1 of the recording apparatus 100 is placed to face upward. The clip 9 is provided so that the body 1 is inclined relative to a ground plane P when placed as above. According to this configuration, the first microphone 5 placed in the front surface 2 can incline the range to acquire sound. According to this configuration, the recording apparatus 100 can be placed so that the front surface 2 of the body 1 is inclined toward a person. As a result, the recording apparatus 100 can more easily acquire the speech of the person.

Second Embodiment

FIG. 14 shows another example of the control system of the recording apparatus 100. Components similar to those shown in FIG. 3 are denoted with the same reference signs and are not described in detail. The example in FIG. 3 is different from the example in FIG. 14 in that the recording apparatus 100 further comprises a sound wave output unit 80 and in that the controller 30 comprises a voice component extraction unit 36, a touch detection unit 37, and a reflected sound detection unit 38.

Figure 15:
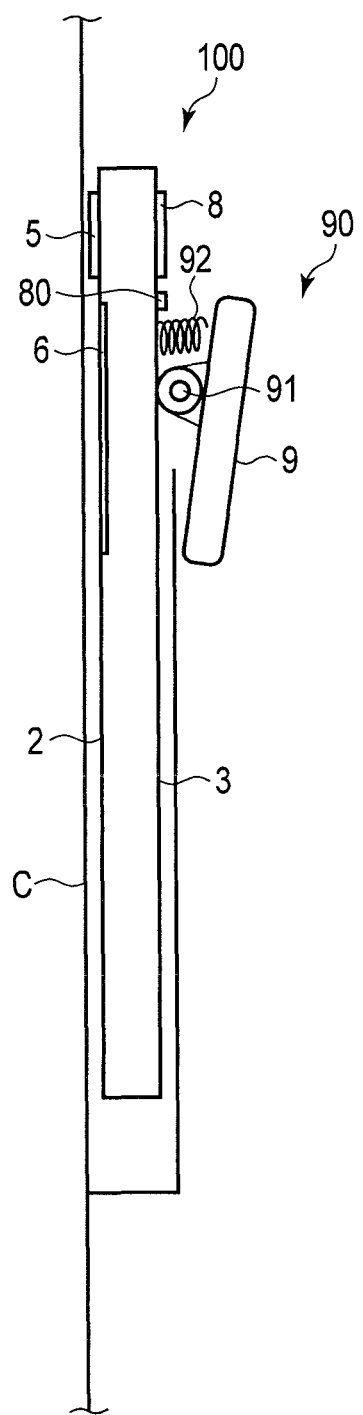
FIG. 15 is a diagram illustrating an example of the use of the recording apparatus according to one embodiment.

The sound wave output unit 80 is configured to output sound waves of sound or vibration. The sound wave output unit 80 outputs, for example, sound waves for use in sonar. As shown in FIG. 15, the sound wave output unit 80 is provided in the rear surface 3 of the recording apparatus 100 and in the vicinity of the second microphone 8.

The voice component extraction unit 36 extracts human voice from the sound collected by the first microphone 5 or the second microphone 8. The human voice tends to change frequency characteristics compared to noise such as environmental noise because of such factors as words, syllables, or emotional expressions of speakers. In contrast, noise changes a little in frequency characteristics and tends to change in volume (amplitude). Thus, the human voice is different in characteristics from noise such as environmental noise. By detecting such a characteristic difference, the voice component extraction unit 36 extracts a voice component which is the human voice from the sound collected by the first microphone 5 or the second microphone 8.

For example, the voice component extraction unit 36 extracts sound of a specific frequency from input sound. Thus, the voice component extraction unit 36 can extract a noise component from the sound. Moreover, the voice component extraction unit 36 generates a variation prediction of the amplitude of the noise component. Thus, the voice component extraction unit 36 sequentially predicts the change of the noise component. The voice component extraction unit 36 can cancel the noise in the sound by subtracting the variation prediction of the noise component from the input sound. As a result, the voice component extraction unit 36 can extract the voice component in which the noise component is canceled from the input sound.

For example, as shown in FIG. 15, when the recording apparatus 100 is put in, for example, the breast pocket, the front surface 2 facing the rear surface 3 in which the clip 9 is provided contacts clothes C. Thus, the first microphone 5 provided in the front surface 2 has more noise than the second microphone 8. Therefore, for example, the voice component extraction unit 36 compares a difference (first difference) between a sound (first sound) collected by the first microphone 5 and a voice component (first voice component) extracted from the first sound with a difference (second difference) between a sound (second sound) collected by the second microphone 8 and a voice component (second voice component) extracted from the second sound. For example, the voice component extraction unit 36 may be configured to compare the first voice component with the second voice component. The first difference corresponds to noise included in the first sound, and the second difference corresponds to noise included in the second sound.

The controller 30 selects a microphone for use in recording processing on the basis of the comparison result by the voice component extraction unit 36. The controller 30 selects a microphone for use in recording processing on the basis of the comparison result of the first difference and the second difference by the voice component extraction unit 36. For example, the controller 30 may be configured to select a microphone for use in recording processing on the basis of the comparison result of the first voice component and the second voice component by the voice component extraction unit 36. Thus, the controller 30 can use a microphone having less noise in recording processing.

Furthermore, as in the example shown in FIG. 15, when the recording apparatus 100 is put and used in, for example, the breast pocket, the front surface 2 contacts clothes C. Thus, when a touch panel is provided in the display panel 6 which is provided in the front surface 2, there is a possibility that a touch operation that is not intended by the user may be performed.

The touch detection unit 37 determines whether a touch operation that is not intended by the user has been performed on the basis of a detection signal detected by the touch sensor 70*a* of the operation unit 70. For example, touch operations on the touch sensor 70*a* generally include, for example, tapping, flicking, swiping, and pinching. Thus, there is a strong possibility that the operation intended by the user may be performed by one of these general touch operations. Therefore, when the user has intentionally performed the touch operation, there is a strong possibility that a detection signal detected by the touch sensor 70*a* has a prescribed regularity (predetermined pattern). Thus, the touch detection unit 37 determines whether a touch operation that is not intended by the user has been performed by determining whether the detection signal detected by the touch sensor 70*a* of the operation unit 70 corresponds to a preset pattern.

When a touch operation which is different from the preset pattern is detected by the touch detection unit 37, the controller 30 determines that the recording apparatus 100 is put and used in, for example, the breast pocket. In this case, the rear surface 3 of the recording apparatus 100 faces the front of the operator of the recording apparatus 100, so that the controller 30 selects the second microphone 8 provided in the rear surface 3 of the recording apparatus 100 as a microphone for use in recording processing. Further, the controller 30 invalidates the touch sensor 70*a* to prevent any wrong operation caused by the touch sensor 70*a* of the operation unit 70.

The reflected sound detection unit 38 detects reflected sound of the sound waves output from the sound wave output unit 80. The reflected sound detection unit 38 detects reflected sound of the sound waves output from the sound wave output unit 80 on the basis of the first sound collected by the first microphone 5 and the second sound collected by the second microphone 8.

Figure 16:
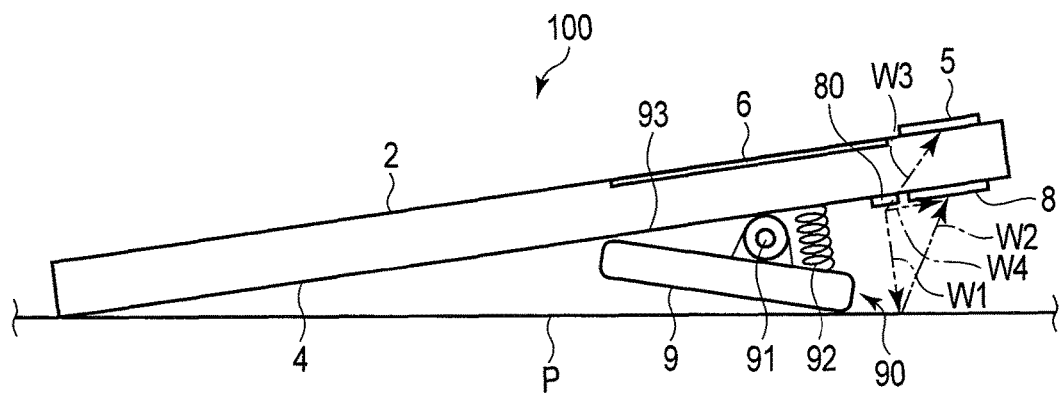
FIG. 16 is a diagram illustrating an example of the use of the recording apparatus according to one embodiment.

For example, when the front surface 2 of the body 1 of the recording apparatus 100 is placed to face upward as shown in FIG. 16, the rear surface 3 faces the ground plane P. As a result of the output of the sound waves from the sound wave output unit 80, sound waves W1 are generated in the air. The sound waves W1 are reflected on the ground plane P, and reflected sound W2 is reflected from the ground plane P. An in-housing vibration W3 which is transmitted from the sound wave output unit 80 to the first microphone 5 is also generated in the body 1 as a result of the output of the sound waves from the sound wave output unit 80. An in-housing vibration W4 which is transmitted from the sound wave output unit 80 to the second microphone 8 is also generated in the body 1 as a result of the output of the sound waves from the sound wave output unit 80.

Figure 17:
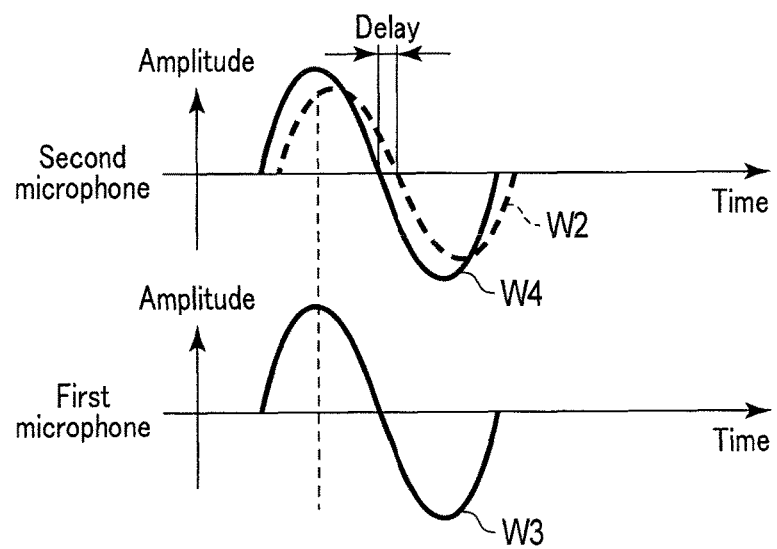
FIG. 17 is an explanatory diagram illustrating an example of the operation of the recording apparatus according to one embodiment.

When the sound waves are output from the sound wave output unit 80 while the front surface 2 of the body 1 of the recording apparatus 100 is placed on the ground plane P to face upward, the first microphone 5 detects the in-housing vibration W3 shown in FIG. 17. The second microphone 8 detects the reflected sound W2 and the in-housing vibration W4 shown in FIG. 17. An upper graph in FIG. 17 shows a waveform detected by the first microphone 5. A lower graph in FIG. 17 shows a waveform detected by the second microphone 8. The vertical axis in the upper graph in FIG. 17 indicates amplitude, and the horizontal axis indicates time.

The propagation channel for the reflected sound W2 is longer than that for the in-housing vibration W4, so that the phase of the reflected sound W2 is delayed. The reflected sound detection unit 38 can detect the reflected sound W2 that is delayed relative to the in-housing vibration W3 and the in-housing vibration W4 by analyzing the waveforms of the first sound collected by the first microphone 5 and the second sound collected by the second microphone 8. The reflected sound detection unit 38 may be configured to detect, as the reflected sound W2, a waveform that is delayed relative to both the in-housing vibration W3 and the in-housing vibration W4, or detect, as the reflected sound W2, a waveform that is delayed relative to one of the in-housing vibration W3 and the in-housing vibration W4.

The reflected sound detection unit 38 can detect the reflected sound W2 that is delayed relative to the in-housing vibration W3 or the in-housing vibration W4, for example, if the second microphone 8 is one centimeter away from the ground plane P. The distance between the second microphone 8 and the ground plane P at which the reflected sound W2 can be detected may be any distance at which the reflected sound W2 is delayed to such a degree that the reflected sound detection unit 38 can distinguish between the in-housing vibration W3 or the in-housing vibration W4 and the reflected sound W2.

When the reflected sound W2 is detected, the controller 30 recognizes that the recording apparatus 100 is mounted on the ground plane P. When the recording apparatus 100 is mounted on the ground plane P, the front surface 2 faces upward. When the recording apparatus 100 is mounted on the ground plane P, the controller 30 selects the first microphone 5 provided in the front surface 2 as a microphone for use in recording processing. Thus, the controller 30 can perform the recording processing by use of the first microphone 5 having directivity wider than that of the second microphone 8 while the recording apparatus 100 is mounted on the ground plane P.

The controller 30 suitably selects one of the processing results by the voice component extraction unit 36, the touch detection unit 37, and the reflected sound detection unit 38, and selects a microphone for use in recording processing on the basis of the selected processing result. The controller 30 may be configured to combine the processing results by the voice component extraction unit 36, the touch detection unit 37, and the reflected sound detection unit 38 to select a microphone for use in recording processing. For example, the controller 30 may be configured to calculate scores that show which of the first microphone 5 and the second microphone 8 to prioritize on the basis of each of the processing results by the voice component extraction unit 36, the touch detection unit 37, and the reflected sound detection unit 38, and select a microphone for use in recording processing on the basis of the sum of the calculated scores.

FIG. 18 shows an example of the operation of the recording apparatus 100 according to the second embodiment.

The controller 30 determines whether to start recording (step S91). For example, the controller 30 determines to start recording when an operation to start recording is input or when a predetermined condition to start recording is satisfied. For example, as described above, the controller 30 determines to start recording when the recording switch 7 is operated. For example, as described above, the controller 30 also determines to start recording on the basis of the on/off state of the clip switch 90, the pose of the recording apparatus 100, the detection of sound, the detection of a specific keyword, or the detection of specific vibration. For example, the controller 30 may be configured to determine to start recording when sound is detected. For example, the controller 30 may also be configured to determine to start recording when a specific keyword is detected. For example, the controller 30 may also be configured to determine to start recording when specific vibration is detected. For example, the controller 30 may also be configured to determine to start recording on the basis of the on/off state of the clip switch 90 and the pose of the recording apparatus 100.

The controller 30 executes the processing in step S91 until it determines to start recording. When the controller 30 determines to start recording (step S91, YES), the controller 30 selects a microphone for use in recording processing (step S92).

The controller 30 controls each unit to start recording by use of the selected microphone (step S93).

The controller 30 determines whether to end the recording (step S94). For example, the controller 30 determines to end the recording when an operation to end the recording is input or when a predetermined condition to end the recording is satisfied. For example, the controller 30 may be configured to determine to end the recording processing when no sound is detected for a time equal to or more than a preset time during the execution of the recording processing. For example, the controller 30 may also be configured to determine to end recording on the basis of the on/off state of the clip switch 90 and the pose of the recording apparatus 100. For example, the controller 30 may also be configured to determine to end recording when a specific keyword is detected. For example, the controller 30 may also be configured to determine to end recording when specific vibration is detected. Moreover, the controller 30 may also be configured to determine to end recording on the basis of other preset conditions.

The controller 30 executes the processing in step S94 until it determines to end recording. When the controller 30 determines to end recording (step S94, YES), the controller 30 outputs the recorded data to the storage unit 40, and saves the recorded data in the storage medium (step S95).

When the controller 30 has saved the recorded data in the storage medium, the controller 30 determines whether an operation to end the operation of the recording apparatus 100 has been input (step S96). For example, when the power supply switch 12 is operated, the controller 30 determines that the operation to end the operation of the recording apparatus 100 has been input.

When no operation to end the operation of the recording apparatus 100 has been input, the controller 30 shifts to the processing in step S91. When the controller 30 determines that the operation to end the operation of the recording apparatus 100 has been input, the controller 30 ends the processing.

Figure 19:
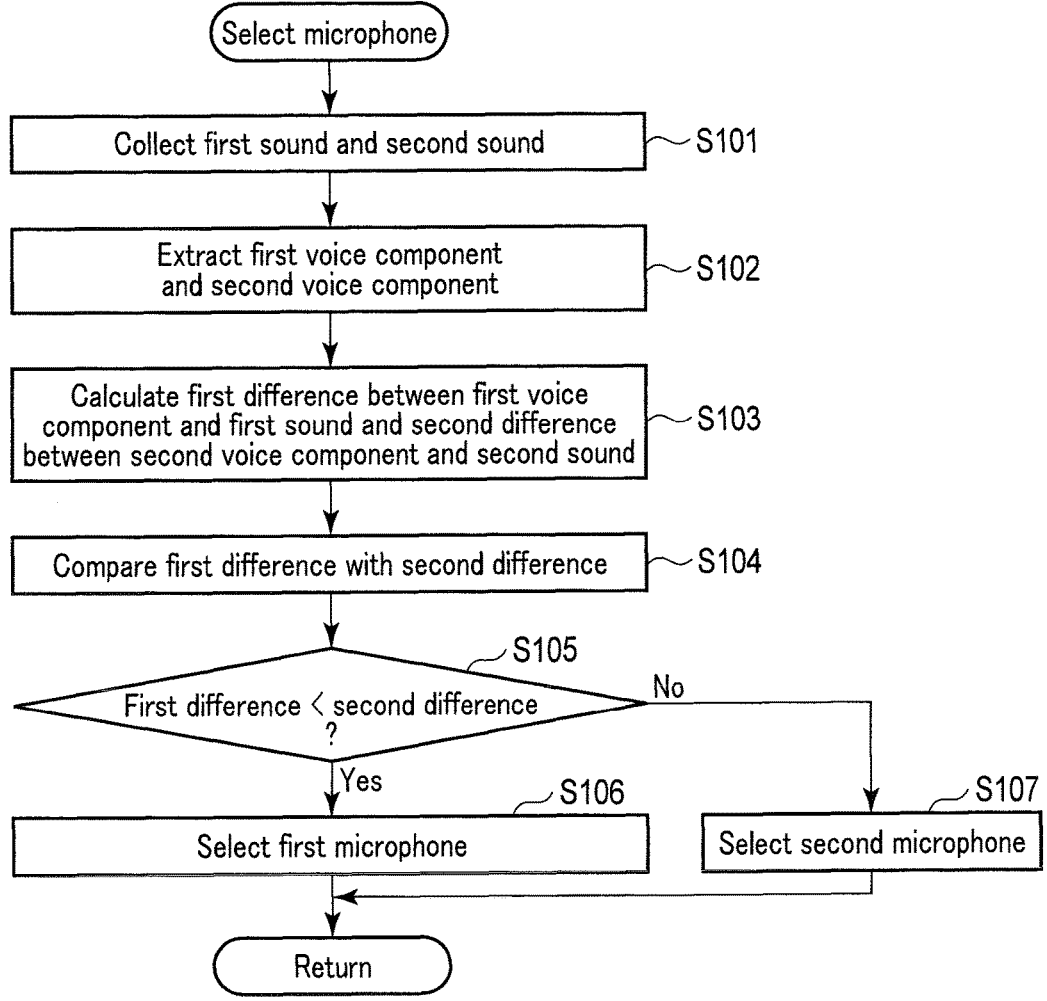
FIG. 19 is a diagram illustrating an example of the operation of the recording apparatus according to one embodiment.
Figure 20:
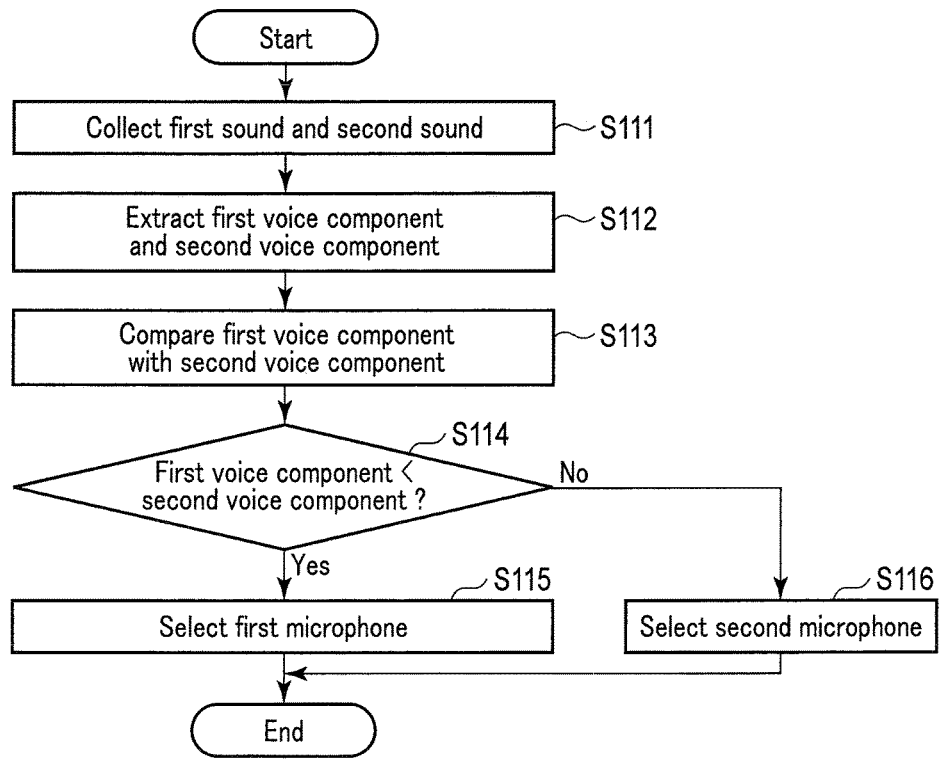
FIG. 20 is a diagram illustrating an example of the operation of the recording apparatus according to one embodiment.
Figure 21:
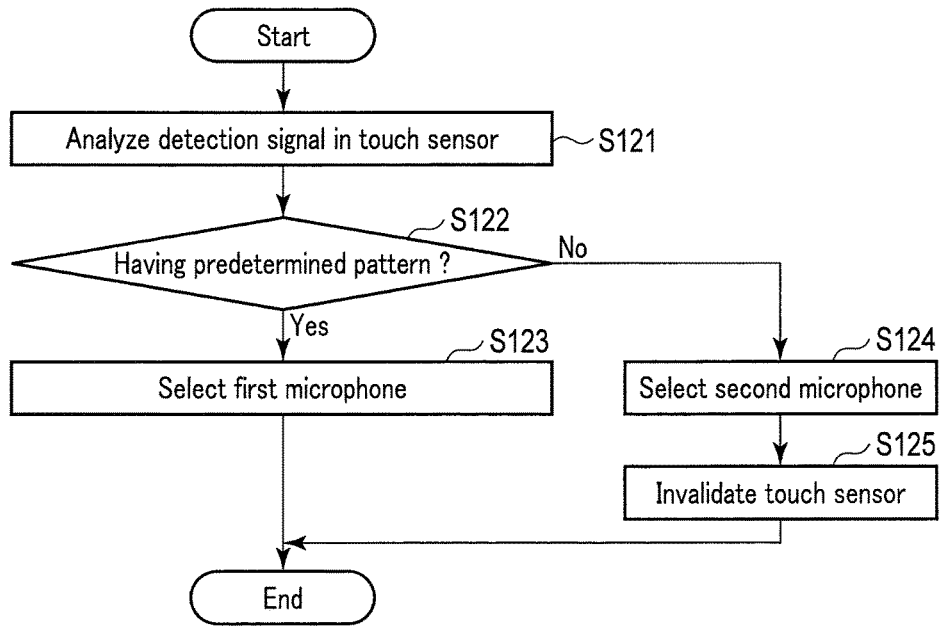
FIG. 21 is a diagram illustrating an example of the operation of the recording apparatus according to one embodiment.

FIG. 19 to FIG. 22 show examples of processing by the controller 30 corresponding to step S92 in FIG. 18. FIG. 19 to FIG. 22 show examples of the processing by the controller 30 for selecting a microphone for use in recording processing on the basis of the processing result by the voice component extraction unit 36. FIG. 21 shows an example of the processing by the controller 30 for selecting a microphone for use in recording processing on the basis of the processing result by the touch detection unit 37. FIG. 22 shows an example of the processing by the controller 30 for selecting a microphone for use in recording processing on the basis of the processing result by the reflected sound detection unit 38.

First, the example in FIG. 19 is described.

The controller 30 controls the first microphone 5 and the second microphone 8 to collect the first sound and the second sound by the first microphone 5 and the second microphone 8 (step S101).

The controller 30 controls the voice component extraction unit 36 to extract the first voice component from the first sound and extract the second voice component from the second sound by the voice component extraction unit 36 (step S102).

The controller 30 controls the voice component extraction unit 36 to calculates the first difference between the first voice component and the first sound and the second difference between the second voice component and the second sound by the voice component extraction unit 36 (step S103).

The controller 30 controls the voice component extraction unit 36 to compare the first difference with the second difference by the voice component extraction unit 36 (step S104).

The controller 30 determines whether the first difference is less than the second difference (step S105). When the controller 30 determines that the first difference is less than the second difference (step S105, YES), the controller 30 selects the first microphone 5 (step S106), and ends the processing. When the controller 30 determines that the first difference is not less than the second difference (step S105, NO), the controller 30 selects the second microphone 8 (step S107), and ends the processing.

As described above, the controller 30 can switch the microphone for use in recording processing between the first microphone 5 and the second microphone 8 on the basis of which of the first difference and the second difference is greater. By selecting the microphone for use in recording processing in this way, the controller 30 can select a microphone having less noise. The controller 30 may be configured to select any one of the first microphone 5 and the second microphone 8 when the first difference is equal to the second difference.

Next, the example in FIG. 20 is described.

The controller 30 controls the first microphone 5 and the second microphone 8 to collect the first sound and the second sound by the first microphone 5 and the second microphone 8 (step S111).

The controller 30 controls the voice component extraction unit 36 to extract the first voice component from the first sound and extract the second voice component from the second sound by the voice component extraction unit 36 (step S112).

The controller 30 controls the voice component extraction unit 36 to compare the first voice component with the second voice component by the voice component extraction unit 36 (step S113).

The controller 30 determines whether the second voice component is less than the first voice component (step S114). When the controller 30 determines that the second voice component is less than the first voice component (step S114, YES), the controller 30 selects the first microphone 5 (step S115), and ends the processing. When the controller 30 determines that the second voice component is not less than the first voice component (step S114, NO), the controller 30 selects the second microphone 8 (step S116).

As described above, the controller 30 switches the microphone for use in recording processing between the first microphone 5 and the second microphone 8 on the basis of which of the first voice component and the second voice component is greater. By selecting the microphone for use in recording processing in this way, the controller 30 can select a microphone having less noise. The controller 30 may be configured to select any one of the first microphone 5 and the second microphone 8 when the first voice component is equal to the second voice component.

Next, the example in FIG. 21 is described.

The controller 30 controls the touch detection unit 37 to analyze the detection signal in the touch sensor 70a by the touch detection unit 37 (step S121).

The controller 30 controls the touch detection unit 37 to determine by the touch detection unit 37 whether the detection signal in the touch sensor 70a has a preset pattern (step S122).

When the controller 30 determines that the detection signal in the touch sensor 70a has the preset pattern (step S122, YES), the controller 30 selects the first microphone 5 (step S123), and ends the processing.

When the controller 30 determines that the detection signal in the touch sensor 70a does not have the preset pattern (step S122, ?YES(NO)?), the controller 30 selects the second microphone 8 (step S124). Further, the controller 30 invalidates the touch sensor 70a (step S125), and ends the processing.

According to the processing described above, the controller 30 causes the touch detection unit 37 to determine whether the detection signal generated by the touch sensor 70a has a signal of the preset pattern. When the detection signal generated by the touch sensor 70a does not have the signal of the preset pattern, the controller 30 switches the microphone for use in recording processing to the second microphone 8. Thus, when the recording apparatus 100 is put and used in, for example, the breast pocket, the controller 30 can select the second microphone 8 that does not contact the clothes C. Consequently, the controller 30 can select a microphone having less noise. The controller 30 can prevent any touch operation that is not intended by the user by invalidating the touch sensor 70a when the recording apparatus 100 is put and used in, for example, the breast pocket.

Next, the example in FIG. 22 is described.

The controller 30 controls the sound wave output unit 80 to output sound by the sound wave output unit 80 (step S131).

The controller 30 controls the first microphone 5 and the second microphone 8 to collect the first sound and the second sound by the first microphone 5 and the second microphone 8 (step S132).

The controller 30 controls the reflected sound detection unit 38 to analyze the first sound or the second sound by the reflected sound detection unit 38 (step S133). Thus, when reflected sound of the sound waves output from the sound wave output unit 80 is included in the first sound or the second sound, the reflected sound detection unit 38 can detect the reflected sound. The reflected sound detection unit 38 may be configured to analyze sound collected by the microphone provided in the same surface as the surface in which the sound wave output unit 80 is provided, and not to analyze sound collected by the microphone provided in the other surface. For example, the sound wave output unit 80 is provided in the rear surface 3 in this example, so that the reflected sound detection unit 38 may be configured to only analyze the second sound collected by the second microphone 8 provided in the rear surface 3.

The controller 30 determines whether the reflected sound has been detected on the basis of the detection results by the reflected sound detection unit 38 (step S134).

When the controller 30 determines that the reflected sound has been detected (step S134, YES), the controller 30 selects the first microphone (step S135), and ends the processing.

When the controller 30 determines that the reflected sound has not been detected (step S134, NO), the controller 30 selects the second microphone 8 (step S136), and ends the processing. When the controller 30 determines that the reflected sound has not been detected (step S134, NO), the controller 30 may be configured to select preset one of the first microphone 5 and the second microphone 8 as the microphone for use in recording processing.

According to the processing described above, the controller 30 can recognize whether the recording apparatus 100 is mounted on the ground plane P on the basis of whether the reflected sound of the sound waves output from the sound wave output unit 80 has been detected. Further, when the controller 30 determines that the recording apparatus 100 is mounted on the ground plane P, the controller 30 selects the first microphone 5 provided in the front surface 2 facing upward as the microphone for use in recording processing. Thus, the controller 30 can perform the recording processing by use of the first microphone 5 having directivity wider than that of the second microphone 8 while the recording apparatus 100 is mounted on the ground plane P.

According to the second embodiment described above, the controller 30 is configured to suitably select one of the processing results by the voice component extraction unit 36, the touch detection unit 37, and the reflected sound detection unit 38, and select a microphone for use in recording processing on the basis of the selected processing result. However, the controller 30 is not limited to this configuration. The controller 30 may be configured to suitably select one of the processing results by the voice component extraction unit 36, the touch detection unit 37, and the reflected sound detection unit 38, the result of a manual operation, the on/off state of the clip switch 90, and the detection result of the pose, and select a microphone for use in recording processing on the basis of the selected result. Further, the controller 30 may be configured to respectively evaluate the processing results by the voice component extraction unit 36, the touch detection unit 37, and the reflected sound detection unit 38, the result of the manual operation, the on/off state of the clip switch 90, and the detection result of the pose to calculate scores that show which of the first microphone 5 and the second microphone 8 to prioritize, and select a microphone for use in recording processing on the basis of the sum of the calculated scores.

Although the recording apparatus 100 has been described by way of example in the embodiments according to the present invention, the recording apparatus 100 is not limited to this configuration. The recording apparatus 100 may be a portable electronic device such as a digital camera, a video camera, a mobile telephone, or a personal digital assistant (PDA) as long as the recording apparatus 100 is configured to comprise more than microphone. Supplementary descriptions similar to those in each of the embodiments are applicable to other embodiments, and the technique used in each of the embodiments may be suitably combined with those in the other embodiments.

The functions described in each of the embodiments described above are not only configured by use of hardware but can also be obtained by use of software by reading the programs that describe the respective functions into a computer. Each of the functions may be configured by suitably selecting one of the software and the hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording apparatus comprising:
    an apparatus body having a front surface and a rear surface that constitute a front and a back;
    a first microphone which is placed in the front surface of the apparatus body and which has a predetermined directivity;
    a second microphone which is provided in the rear surface facing the front surface of the apparatus body and which has a directivity that is narrower than that of the first microphone;
    a pose detection unit which detects whether the apparatus body is horizontally placed or vertically placed; and
    a controller which switches a microphone for use in recording processing between the first microphone and the second microphone to perform the recording processing in accordance with the state of the apparatus body, wherein the controller switches the microphone for use in the recording processing between the first microphone and the second microphone on the basis of whether the apparatus body is horizontally placed.

2. The recording apparatus according to claim 1, wherein the controller performs the recording processing by the first microphone when the apparatus body is horizontally placed, and the controller performs the recording processing by the second microphone when the apparatus body is not horizontally placed.

3. The recording apparatus according to claim 1, wherein the controller performs sound collection processing to extract a keyword from sound obtained by one of the first microphone and the second microphone, and performs the recording processing by the first microphone when a specific keyword is extracted as a result of the sound collection processing and when the apparatus body is horizontally placed.

4. The recording apparatus according to claim 1, further comprising a vibration detection unit which detects vibration of the apparatus body,
    wherein the controller performs the recording processing by the second microphone when specific vibration is detected by the vibration detection unit and when the apparatus body is not horizontally placed.

5. The recording apparatus according to claim 1, further comprising:
    a clip which catches a catching target material to fix the apparatus body to the catching target material; and
    a clip switch which turns off when the clip catches the catching target material and which turns on when the clip does not catch the catching target material,
    wherein the controller controls a start and end of the recording processing on the basis of the on/off state of the clip switch.

6. The recording apparatus according to claim 5, wherein the controller performs the recording processing by the second microphone when the clip switch has changed from off to on, and the controller ends the recording processing when the clip switch has changed from on to off during the recording processing.

7. The recording apparatus according to claim 5,
    wherein the controller performs the recording processing by the second microphone when the clip switch has changed from on to off and when the apparatus body is vertically placed, and the controller ends the recording processing when the clip switch has changed from off to on during the recording processing.

8. The recording apparatus according to claim 7, wherein the controller performs recording processing for sound having a preset frequency range when the clip switch has changed from on to off and when the apparatus body is vertically placed.

9. The recording apparatus according to claim 7, further comprising:
    a display which displays information;
    an operation unit which comprises a touch sensor formed integrally with the display; and
    a controller which causes the controller to perform recording processing and invalidate the touch sensor when the clip switch has changed from on to off and when the apparatus body is vertically placed.

10. The recording apparatus according to claim 1, further comprising a voice component extraction unit which extracts a first voice component from a first sound collected by the first microphone, extracts a second voice component from a second sound collected by the second microphone, calculates a first difference between the first voice component and the first sound, and calculates a second difference between the second voice component and the second sound,
    wherein the controller switches the microphone for use in the recording processing between the first microphone and the second microphone on the basis of which of the first difference and the second difference is greater.

11. The recording apparatus according to claim 1, further comprising a voice component extraction unit which extracts a first voice component from a first sound collected by the first microphone, and extracts a second voice component from a second sound collected by the second microphone, wherein the controller switches the microphone for use in the recording processing between the first microphone and the second microphone on the basis of which of the first voice component and the second voice component is greater.

12. The recording apparatus according to claim 1, further comprising:
a display which displays information;
a touch sensor which is formed integrally with the display and which generates a detection signal in accordance with an operational input; and
a touch detection unit which determines whether the detection signal generated by the touch sensor comprises a signal of a preset pattern,
wherein the controller switches the microphone for use in the recording processing to the second microphone when the detection signal generated by the touch sensor does not comprise the signal of the preset pattern.

13. The recording apparatus according to claim 12, further comprising a controller which invalidates the touch sensor when the detection signal generated by the touch sensor does not comprise the signal of the preset pattern.

14. The recording apparatus according to claim 1, further comprising a sound wave output unit which is provided in the rear surface and which outputs sound waves, wherein the controller switches the microphone for use in the recording processing to the first microphone when reflected sound of the sound waves output from the sound wave output unit is detected by the second microphone.

15. A control method of a recording apparatus, the recording apparatus comprising an apparatus body having a front surface and a rear surface that constitute a front and a back, a first microphone which is placed in the front surface of the apparatus body and which has a predetermined directivity, and a second microphone which is provided in the rear surface facing the front surface of the apparatus body and which has a directivity that is narrower than that of the first microphone, the control method comprising:
detecting whether the apparatus body is horizontally placed or vertically placed; and
switching a microphone for use in recording processing between the first microphone and the second microphone in accordance with state of the apparatus body to perform the recording processing, wherein the microphone is switched for use in the recording processing between the first microphone and the second microphone on the basis of whether the apparatus body is horizontally placed.

* * * * *